United States Patent
Wojcik et al.

(10) Patent No.: US 9,774,192 B2
(45) Date of Patent: *Sep. 26, 2017

(54) ELECTRONIC DEVICE CASE

(71) Applicant: 1 OAK TECHNOLOGIES, LLC, Fort Collins, CO (US)

(72) Inventors: James John Wojcik, Kirkland, WA (US); Adam Douglas Center, Fort Collins, CO (US); Abhishek Joshi, Seattle, WA (US); Adam Benzion, Kirkland, WA (US)

(73) Assignee: Otter Products, LLC, Fort Collins, CO (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/834,268

(22) Filed: Mar. 15, 2013

(65) Prior Publication Data

US 2014/0195826 A1 Jul. 10, 2014

Related U.S. Application Data

(60) Provisional application No. 61/783,212, filed on Mar. 14, 2013, provisional application No. 61/749,244, filed on Jan. 4, 2013.

(51) Int. Cl.
*H02J 4/00* (2006.01)
*G06F 1/16* (2006.01)
(Continued)

(52) U.S. Cl.
CPC ............ *H02J 4/00* (2013.01); *G01R 31/3606* (2013.01); *G06F 1/1632* (2013.01); *G06F 1/263* (2013.01);
(Continued)

(58) Field of Classification Search
CPC ........ G06F 1/1628; G06F 1/189; G06F 1/263; G06F 1/28; H02J 7/355; H02J 2007/0016; H02J 7/0004; H02J 7/0054; H02J 7/025; H02J 7/05; G01R 31/3689; H04B 5/0012; H04B 5/0031; H04B 5/0037; Y10T 307/696
See application file for complete search history.

(56) References Cited

U.S. PATENT DOCUMENTS

| 4,312,580 A | 1/1982 | Schwomma et al. |
| 4,413,221 A | 11/1983 | Benjamin et al. |

(Continued)

FOREIGN PATENT DOCUMENTS

| WO | 9400037 A1 | 1/1994 |
| WO | 9941958 A | 8/1999 |
| WO | 2012074151 A | 6/2012 |

*Primary Examiner* — Terrell Johnson

(57) ABSTRACT

A case for an electronic device is provided. The case includes a battery and electrical circuitry. The electrical circuitry is configured to receive electrical power from a power source connected to the case, supply the electrical power to the electronic device, and monitor an amount of current of the electrical power used by the electronic device. The electrical circuitry is also configured to charge the battery using a remaining amount of current of the electrical power where the sum of the amount of current used by the electronic device and the remaining amount of current do not exceed a current limit for the power source.

22 Claims, 20 Drawing Sheets

(51) Int. Cl.

| | | |
|---|---|---|
| *H04W 52/02* | (2009.01) | |
| *H02J 7/00* | (2006.01) | |
| *G06F 1/26* | (2006.01) | |
| *H05K 5/02* | (2006.01) | |
| *H05K 5/00* | (2006.01) | |
| *G01R 31/36* | (2006.01) | |
| *G06F 9/445* | (2006.01) | |
| *G06F 21/86* | (2013.01) | |
| *H04M 1/18* | (2006.01) | |
| *H04M 1/725* | (2006.01) | |

(52) U.S. Cl.
CPC ............ *G06F 8/61* (2013.01); *G06F 21/86* (2013.01); *H02J 7/0042* (2013.01); *H02J 7/0044* (2013.01); *H02J 7/0047* (2013.01); *H02J 7/0054* (2013.01); *H04M 1/185* (2013.01); *H04M 1/72575* (2013.01); *H04W 52/0296* (2013.01); *H05K 5/0086* (2013.01); *H05K 5/0247* (2013.01); *H02J 2007/005* (2013.01); *H02J 2007/0062* (2013.01); *H02J 2007/0096* (2013.01); *Y02B 60/50* (2013.01); *Y10T 307/344* (2015.04); *Y10T 307/406* (2015.04)

(56) References Cited

U.S. PATENT DOCUMENTS

| | | | |
|---|---|---|---|
| 4,957,205 A | 9/1990 | Rose | |
| 5,140,310 A | 8/1992 | DeLuca et al. | |
| 5,311,112 A | 5/1994 | Creaco et al. | |
| 5,325,040 A | 6/1994 | Bogut et al. | |
| 5,541,813 A | 7/1996 | Satoh et al. | |
| 5,583,742 A | 12/1996 | Noda et al. | |
| 5,669,004 A | 9/1997 | Sellers | |
| 5,681,122 A | 10/1997 | Burke | |
| 5,933,812 A | 8/1999 | Meyer et al. | |
| 6,005,368 A | 12/1999 | Frame | |
| 6,043,626 A | 3/2000 | Snyder et al. | |
| 6,058,356 A | 5/2000 | Swanson et al. | |
| 6,169,384 B1* | 1/2001 | Shannon | H02J 7/0044 307/66 |
| 6,184,654 B1 | 2/2001 | Bachner et al. | |
| 6,304,459 B1 | 10/2001 | Toyosato et al. | |
| 6,317,313 B1 | 11/2001 | Mosgrove et al. | |
| 6,356,058 B1 | 3/2002 | Maio et al. | |
| 6,388,877 B1 | 5/2002 | Canova, Jr. et al. | |
| 6,405,049 B2 | 6/2002 | Herrod et al. | |
| 6,456,487 B1 | 9/2002 | Hetterick | |
| 6,504,710 B2 | 1/2003 | Sutton et al. | |
| 6,532,152 B1 | 3/2003 | White et al. | |
| 6,538,413 B1 | 3/2003 | Beard et al. | |
| 6,944,782 B2 | 9/2005 | von Mueller et al. | |
| 7,116,079 B2 | 10/2006 | Bayne et al. | |
| 7,312,984 B2 | 12/2007 | Richardson et al. | |
| 7,318,521 B2 | 1/2008 | Lau | |
| 7,359,184 B2 | 4/2008 | Lord | |
| 7,400,917 B2 | 7/2008 | Wood et al. | |
| 7,612,997 B1 | 11/2009 | Diebel et al. | |
| 7,782,610 B2 | 8/2010 | Diebel et al. | |
| 7,889,498 B2 | 2/2011 | Diebel et al. | |
| 8,013,572 B2 | 9/2011 | Rodgers | |
| 8,286,013 B2 | 10/2012 | Chen et al. | |
| 8,367,235 B2 | 2/2013 | Huang | |
| 8,690,600 B1* | 4/2014 | Zeolla | H01R 13/72 439/131 |
| 9,153,109 B1 | 10/2015 | Foster et al. | |
| 2002/0075003 A1* | 6/2002 | Fridman | H02J 7/0047 324/426 |
| 2005/0188203 A1 | 8/2005 | Bhaskaran et al. | |
| 2005/0189913 A1 | 9/2005 | Vitanov et al. | |
| 2005/0247584 A1 | 11/2005 | Lu | |
| 2005/0279661 A1 | 12/2005 | Hodges | |
| 2006/0244422 A1 | 11/2006 | Digiovanna et al. | |
| 2006/0255493 A1 | 11/2006 | Fouladpour | |
| 2006/0261777 A1* | 11/2006 | Li | H02J 7/355 320/101 |
| 2007/0052600 A1 | 3/2007 | Kamitani et al. | |
| 2007/0071423 A1 | 3/2007 | Fantone et al. | |
| 2007/0115387 A1 | 5/2007 | Ho | |
| 2007/0138920 A1 | 6/2007 | Austin et al. | |
| 2007/0146985 A1 | 6/2007 | Mick et al. | |
| 2007/0158220 A1 | 7/2007 | Cleereman et al. | |
| 2007/0226527 A1* | 9/2007 | Ang | 713/320 |
| 2008/0164855 A1* | 7/2008 | Tam | G06F 1/263 323/233 |
| 2008/0269724 A1 | 10/2008 | Sarkinen et al. | |
| 2008/0272741 A1 | 11/2008 | Kanamori | |
| 2008/0315826 A1* | 12/2008 | Alberth, Jr. | H02J 7/0013 320/101 |
| 2008/0316687 A1 | 12/2008 | Richardson et al. | |
| 2009/0017884 A1 | 1/2009 | Rotschild | |
| 2009/0037284 A1 | 2/2009 | Lewis et al. | |
| 2009/0051223 A1 | 2/2009 | Woo | |
| 2009/0066529 A1 | 3/2009 | Fukada | |
| 2009/0115369 A1 | 5/2009 | Lin et al. | |
| 2009/0186264 A1 | 7/2009 | Huang | |
| 2009/0322158 A1 | 12/2009 | Stevens et al. | |
| 2010/0003950 A1 | 1/2010 | Ray et al. | |
| 2010/0093412 A1 | 4/2010 | Serra et al. | |
| 2010/0124040 A1* | 5/2010 | Diebel | G06F 1/1628 361/816 |
| 2010/0171234 A1 | 7/2010 | Lee et al. | |
| 2011/0050164 A1 | 3/2011 | Partovi et al. | |
| 2011/0159324 A1 | 6/2011 | Huang et al. | |
| 2012/0028691 A1 | 2/2012 | Koehl | |
| 2012/0088558 A1 | 4/2012 | Song | |
| 2012/0106037 A1 | 5/2012 | Diebel et al. | |
| 2012/0303520 A1 | 11/2012 | Huang | |
| 2012/0306431 A1 | 12/2012 | Li et al. | |
| 2012/0314354 A1 | 12/2012 | Rayner | |
| 2012/0316811 A1 | 12/2012 | Choi et al. | |
| 2012/0319487 A1 | 12/2012 | Shah | |
| 2013/0069583 A1 | 3/2013 | Lemelman et al. | |
| 2013/0214730 A1 | 8/2013 | Lu et al. | |
| 2013/0262248 A1 | 10/2013 | Kim et al. | |
| 2014/0117921 A1* | 5/2014 | Suomela | H04B 5/0031 320/103 |
| 2014/0210406 A1 | 7/2014 | Na et al. | |
| 2014/0217965 A1 | 8/2014 | Wiemeersch et al. | |
| 2015/0111626 A1 | 4/2015 | Bell | |
| 2015/0364938 A1 | 12/2015 | Lapetina et al. | |
| 2016/0211702 A1 | 7/2016 | Muratov et al. | |
| 2016/0261133 A1 | 9/2016 | Wang | |

* cited by examiner

ELECTRONIC DEVICE CASE

CROSS-REFERENCE TO RELATED APPLICATIONS

This application claims the benefit of U.S. Provisional Application 61/749,244, filed Jan. 4, 2013, and U.S. Provisional Application 61/783,212, filed Mar. 14, 2013, both of which are hereby incorporated by reference in their entirety.

FIELD

The present application relates to cases for electronic devices. More specifically, the present application relates to a protective case with power management features.

BACKGROUND

Many types of electronic devices are used for communication and entertainment purposes. Electronic devices include devices such as cellular phones, smartphones, mobile communication devices, tablets, computers, cameras, video players, electronic media readers, audio players, handheld scanners, two-way radios, global positioning satellite (GPS) devices, and other types of electronic computing or communication devices, including combinations thereof. These devices often contain sensitive or fragile components, such as electronic components or glass screens, which can be easily damaged if the device is dropped or exposed to substantial forces. To protect the device from damage, it can be installed in a protective enclosure.

Electronic devices are commonly powered by one or more internal batteries. These batteries are often rechargeable. Typically, devices with more computational power and/or larger displays consume the available battery power more quickly. If an electronic device's battery is exhausted, the device may become unusable until the battery can be recharged or until the device can be connected to another power source. Battery capacity often becomes an issue due to factors such as: power requirements of the electronic device, extended usage of the electronic device, physical space constraints of the battery, power requirements of peripherals attached to the electronic device, temperature extremes, unavailability of a power source for charging, decreased battery capacity due to aging of the battery, decreased battery life due to the number of charge/discharge cycles a battery has endured, or combinations thereof. These factors can reduce the usefulness of electronic devices because use time of the device between recharges becomes shorter and the user must typically recharge the device before use can continue.

In some situations, a user may carry a spare battery for the electronic device that has been previously charged but is not electrically connected to the electronic device. The spare battery can be used as a replacement for a discharged battery. While carrying the spare battery enables the user to use the device again without having to find a charging source, this approach has drawbacks. First, the user must remember to carry the spare battery(s), in addition to the electronic device, because the spare battery will not typically be physically attached to the electronic device when not in use. Second, replacing an exhausted battery, or swapping an exhausted battery into the electronic device for charging purposes, typically requires that the device be shut down, or otherwise turned off, and restarted or rebooted. This process is often inconvenient and typically results in temporary loss of communication and/or data. Finally, when a charging source is available, the various batteries must be swapped into and out of the electronic device in order to charge them, unless a separate host charging device is available for the extra battery.

In some situations, some of the problems discussed above are resolved through use of a supplemental battery pack that attaches to the electronic device. The battery pack is mechanically and electrically attached to the electronic device in a manner such that the electronic device can make use of both its internal battery and a supplemental battery in the battery pack without having to shut down the electronic device, or otherwise temporarily remove power from the electronic device. However, existing solutions have drawbacks.

From an electrical standpoint, existing solutions take one of two approaches regarding how the two batteries (a battery in the external case for the electronic device and a battery inside the electronic device itself) are charged. In one approach, the two batteries are used and/or charged alternately. At any point in time the electronic device is only utilizing one of the batteries or is only charging one of the batteries. When the batteries are not being charged and one of the batteries becomes discharged, or becomes sufficiently low in power, the electronic device and/or the case switches usage from one of the batteries to the other. This approach has the limitation that one of the batteries may be exhausted before use of the other begins. If the internal battery is exhausted first and the electronic device is operating off of the supplemental battery, the user no longer has the flexibility of removing the supplemental battery/case from the device and using the electronic device without it.

In an alternate approach, both batteries are used and/or charged simultaneously as if they are a single battery. This approach presents several problems. First, the user and/or the electronic device cannot selectively control which of the batteries is charged first. Second, charging batteries in parallel may not be a preferred method if the batteries have different characteristics. Third, charging both batteries simultaneously may draw too much current from the power source and/or otherwise exceed the specifications of the power source. For example, a Universal Serial Bus (USB) interface may only be specified to provide 500 mA (milliamperes) of current and charging both batteries simultaneously may exceed that limit. Drawing too much current from a power source may damage the power source, may damage the device that hosts the power source (i.e., the computer in which a USB port is located), may cause the power source to overheat, or may cause the power source or host device to enter a failsafe mode which discontinues power until the power source or host device is reset and/or rebooted.

SUMMARY

In one embodiment, a case for an electronic device is provided. The case includes a battery and electrical circuitry. The electrical circuitry is configured to receive electrical power from a power source connected to the case, supply the electrical power to the electronic device, and monitor an amount of current of the electrical power used by the electronic device. The electrical circuitry is also configured to charge the battery using a remaining amount of current of the electrical power where the sum of the amount of current used by the electronic device and the remaining amount of current do not exceed a current limit for the power source.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Figure 1:
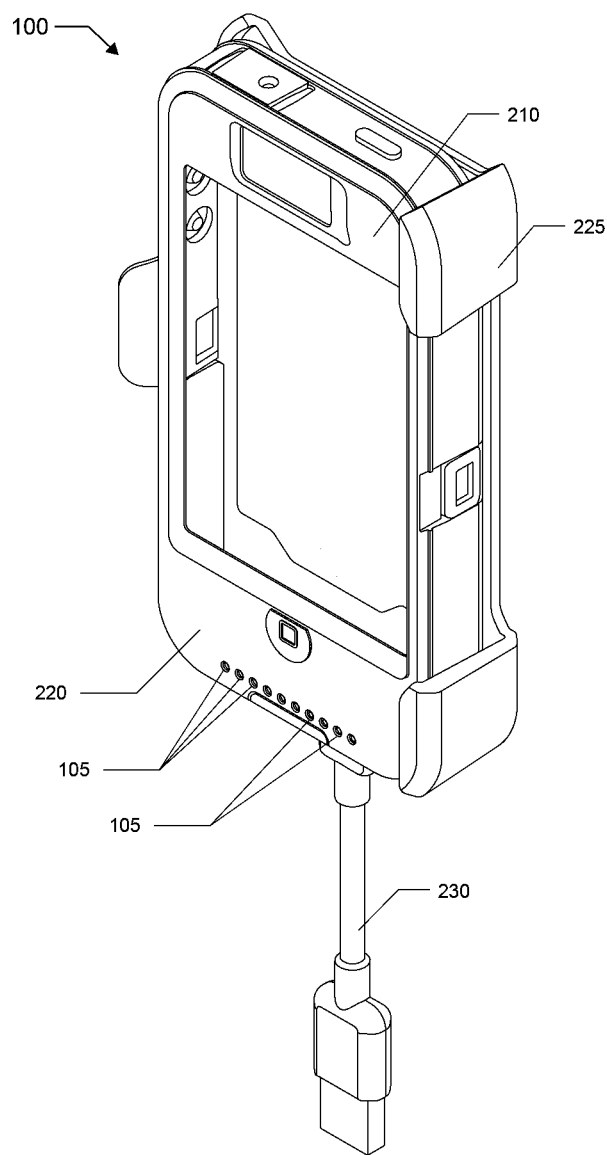
FIG. 1 is a front perspective view of a protective enclosure for an electronic device.
Figure 2:
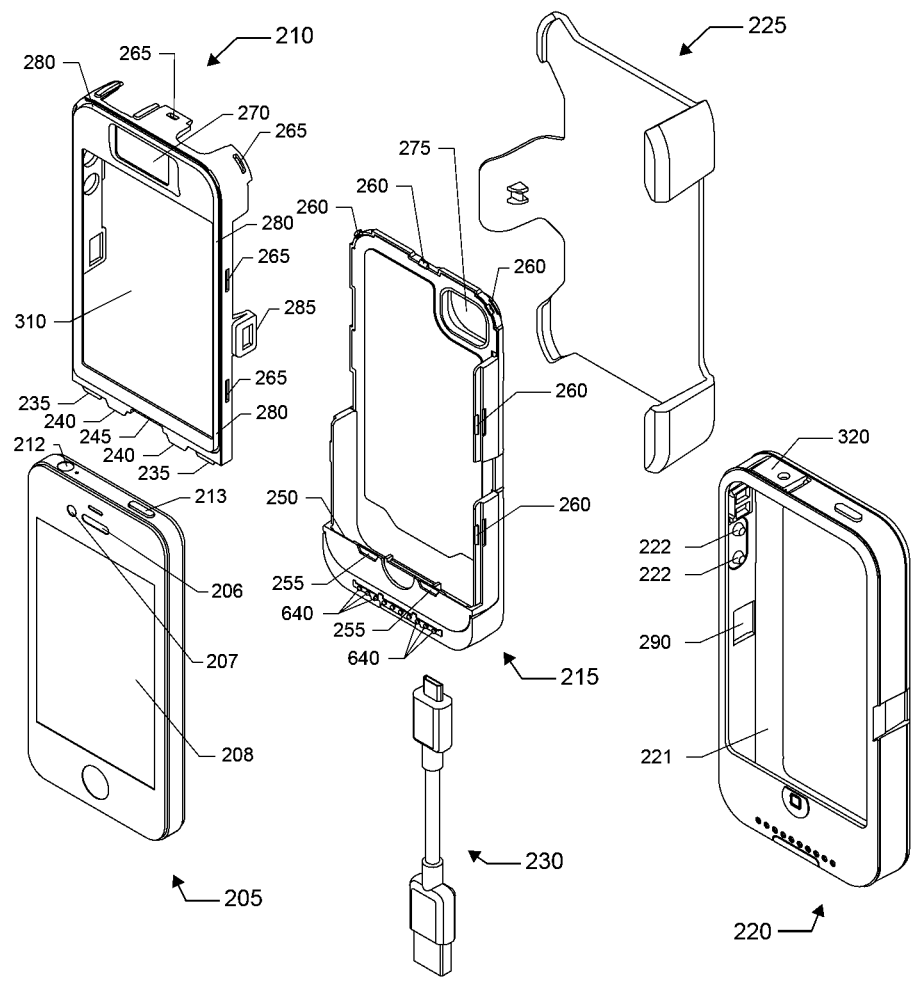
FIG. 2 is an exploded front perspective view of a protective enclosure for an electronic device.

FIG. 1 is a front perspective view of a protective enclosure for an electronic device. A protective enclosure 100 for an electronic device can include a hard shell that at least partially surrounds and protects the electronic device. The hard shell can include a front shell 210 and a back shell 215. The front shell 210 can attach to the back shell 215 in any suitable way to form the hard shell. The front shell 210 can cover at least a portion of a front surface of the electronic device 205, and the back shell 215 can cover at least a portion of a back surface of the electronic device. In one example, the back shell 215 can also cover a portion of the front surface of the electronic device, as shown in FIG. 2. The hard shell can be made from any suitable material, such as polycarbonate or any other suitable type of polymer, nylon, fiberglass-filled nylon, or carbon fiber.

Figure 3:
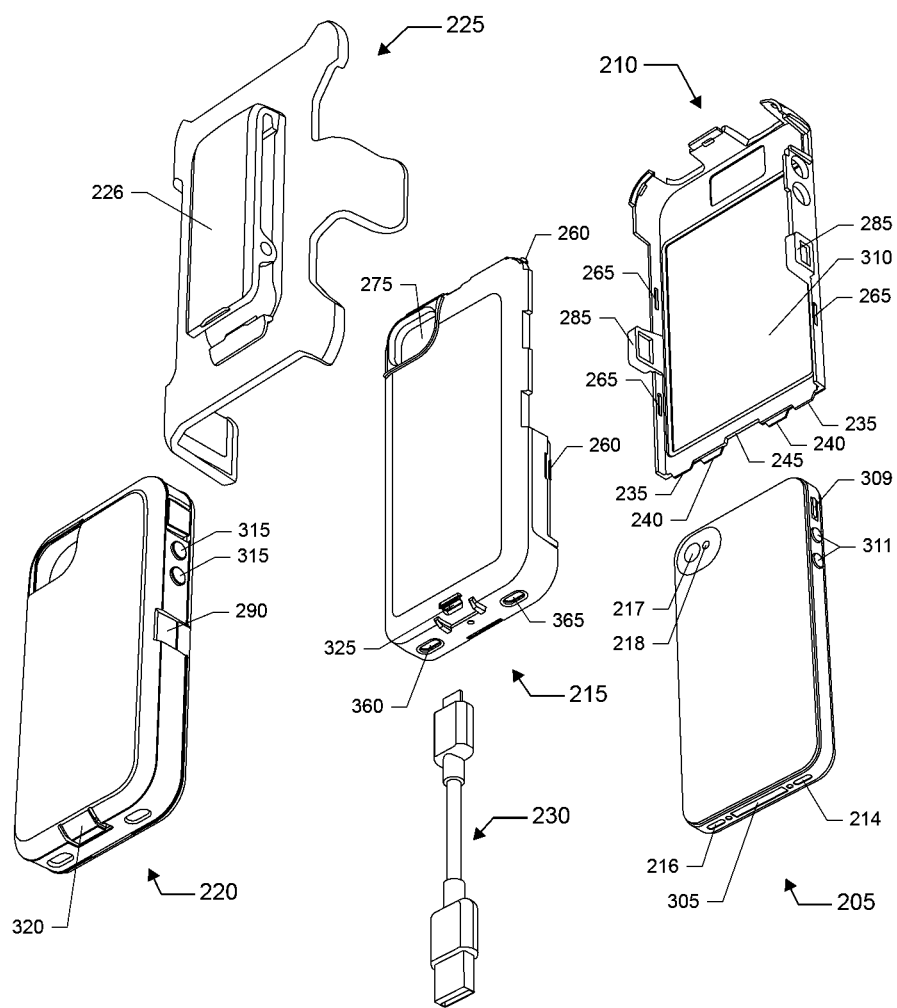
FIG. 3 is an exploded rear perspective view of a protective enclosure for an electronic device.
Figures 4, 5:
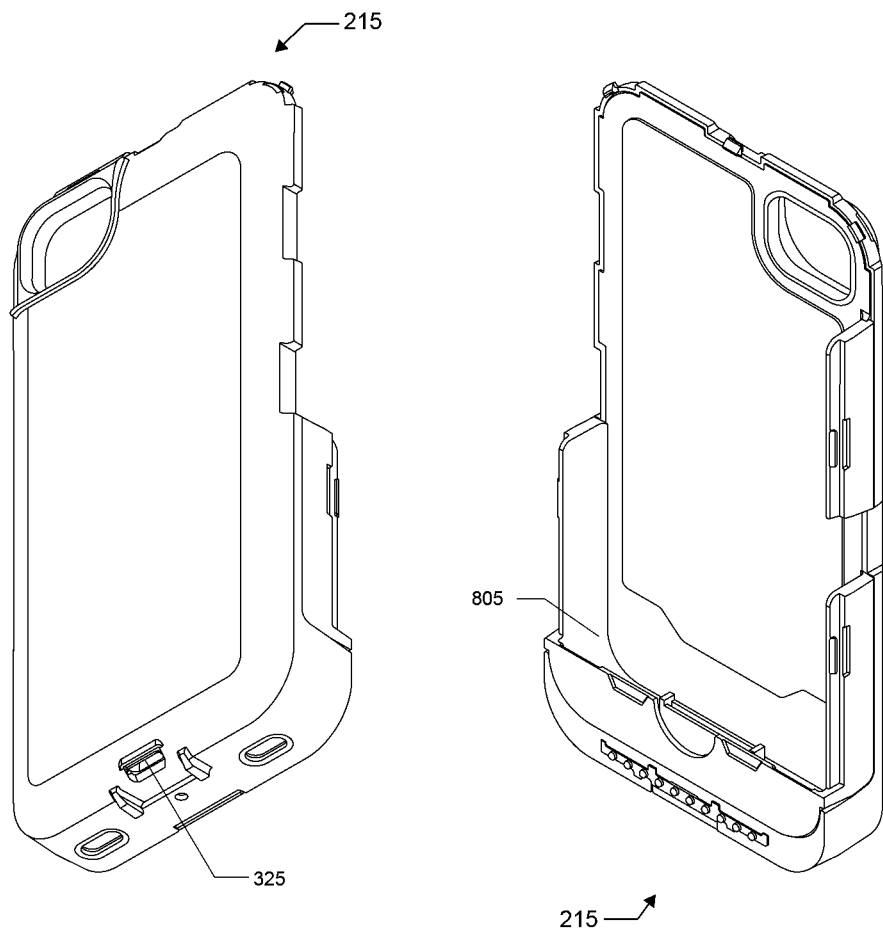
FIG. 4 is a rear perspective view of a back shell of a protective enclosure for an electronic device.
FIG. 5 is a front perspective view of a back shell of a protective enclosure for an electronic device.

The hard shell can include a plurality of retention features that allow the front shell 210 to attach to the back shell 215. For example, the front shell 210 can include a plurality of tabs (e.g. 235, 240) extending from a mating edge 245 of the front shell 210. The plurality of tabs (235, 240) can be configured to engage a mating edge 250 of the back shell 215, as shown in FIGS. 2 and 3. At least one of the tabs extending from the mating edge 245 of the front shell 210 can be configured to slide behind the mating edge 250 of the back shell 215. At least one of the tabs extending form the mating edge 245 of the front shell 210 can be configured to slide in front of the mating edge 250 of the back shell 215. The back shell 215 can include a recess 255 to receive each tab (e.g. 235, 240). In one example, as shown in FIGS. 2 and 3, the front shell 210 can include four tabs (235, 240) extending from its mating edge 245. The two outer tabs 235 can slide behind the mating edge 250 of the back shell 215, and the two inner tabs 245 can slide in front of the mating edge 250 of the back shell 215. In this way, the mating edge 250 of the back shell 215 can be sandwiched between the inner and outer tabs (235, 240) that extend from the front shell 210, which can resist motion of the front shell relative to the back shell.

Although one embodiment is shown and described, this is not limiting. The number, placement, and dimensions of the tabs (235, 240) can vary. For example, tabs can extend from the back shell 215 instead of from the front shell 210. Alternately, the tabs (235, 240) can extend from both shells. The tabs (235, 240) can be wider or narrower than the tabs shown in FIGS. 2 and 3. In one example, the tabs can have a width of about 0.25 to 2.0 in. In another example, the tabs (235, 240) can extend the length of the mating edge 245 of the front shell 210. Also, more or fewer than four tabs can be used. Alternately, retention features other than tabs can be used. Alternatively, the protective case may be configured to include a back shell without a front shell, or a front shell without a back shell. In either instance, tabs may extend from a shell to engage with the electronic device itself to mount the shell to the electronic device. The tabs can assist in holding the electronic device 205 securely against the front or back shell. Although a protective case with only a front or back shell may not provide as much protection for the electronic device as a case with both a front and back shell, some users may prefer this configuration to reduce the size, weight, or complexity of the protective case.

The hard shell can include a plurality of retention features that allow the front shell 210 to attach to the back shell 215. In one example, the hard shell can include a plurality of tabs extending from one of the hard shell components (e.g. front or back shell), and the plurality of tabs can snap into a plurality of corresponding slots on the opposing hard shell component. For example, as shown in FIGS. 2 and 3, the back shell 215 can include a plurality of tabs 260 extending from locations near its perimeter, and the plurality of tabs can be configured to snap into a plurality of slots 265 located near the perimeter of the front shell 210. In one example, the plurality of tabs 260 can extend outwardly from the left side, right side, and top end of the back shell 215 and snap into the plurality of slots 265 in the left side, right side, and top end of the front shell 210. In another example, the tabs 260 can extend from the front shell 210 and snap into corresponding slots 265 on the back shell 215. Similarly, any other suitable retention features can be used as a substitute for the plurality of tabs and slots to attach the front shell 210 to the back shell 215.

Figure 7:
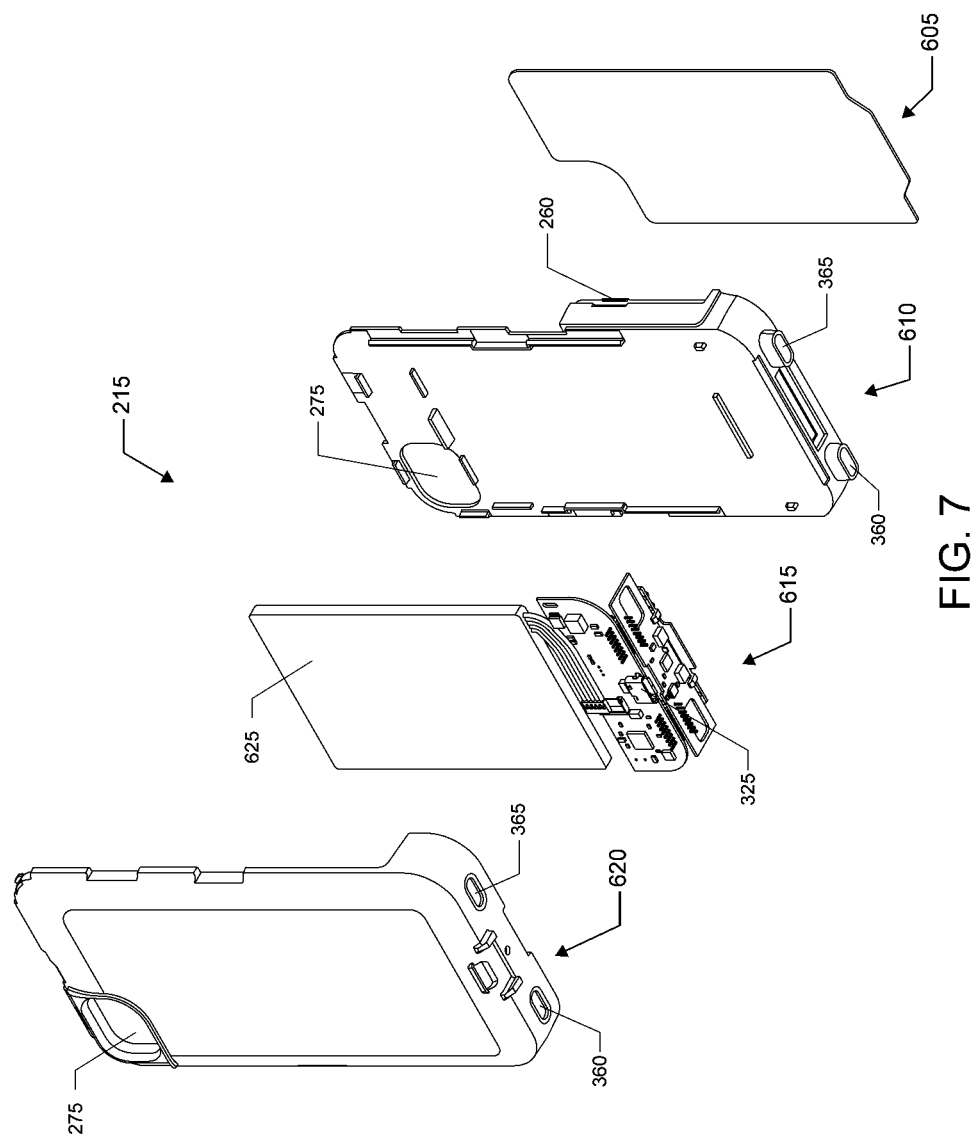
FIG. 7 is an exploded rear perspective view of a back shell of a protective enclosure for an electronic device.

The hard shell can include various openings to allow for operability of the electronic device 205 by a user when installed in the protective enclosure 100. For example, for a protective enclosure 100 for an APPLE IPHONE, the hard shell can include an opening 270 to accommodate a first speaker 206 and a front-facing camera 207 located on a front surface of the electronic device 205. The hard shell can include an opening for a switch 309 located on a left side surface of the electronic device 205. The hard shell can include openings for volume control buttons 311 located on the left side of the electronic device 205. The hard shell can include openings for a headphone jack 212 and power button 213 located on a top side surface of the electronic device 205. The hard shell can include openings for a microphone 214 and a second speaker 216 on a bottom side surface of the electronic device 205. In one example, as shown in FIGS. 3 and 7, the back shell 215 can include a microphone opening 365 and a second speaker opening 360. The microphone opening 365 can be designed to avoid introducing echoes or reverberations into the sound waves that are received by the microphone 214 of the electronic device 205. The hard shell can include an opening 275 for a camera 217 and a flash 218 located on a back surface of the electronic device 205.

Figure 8:
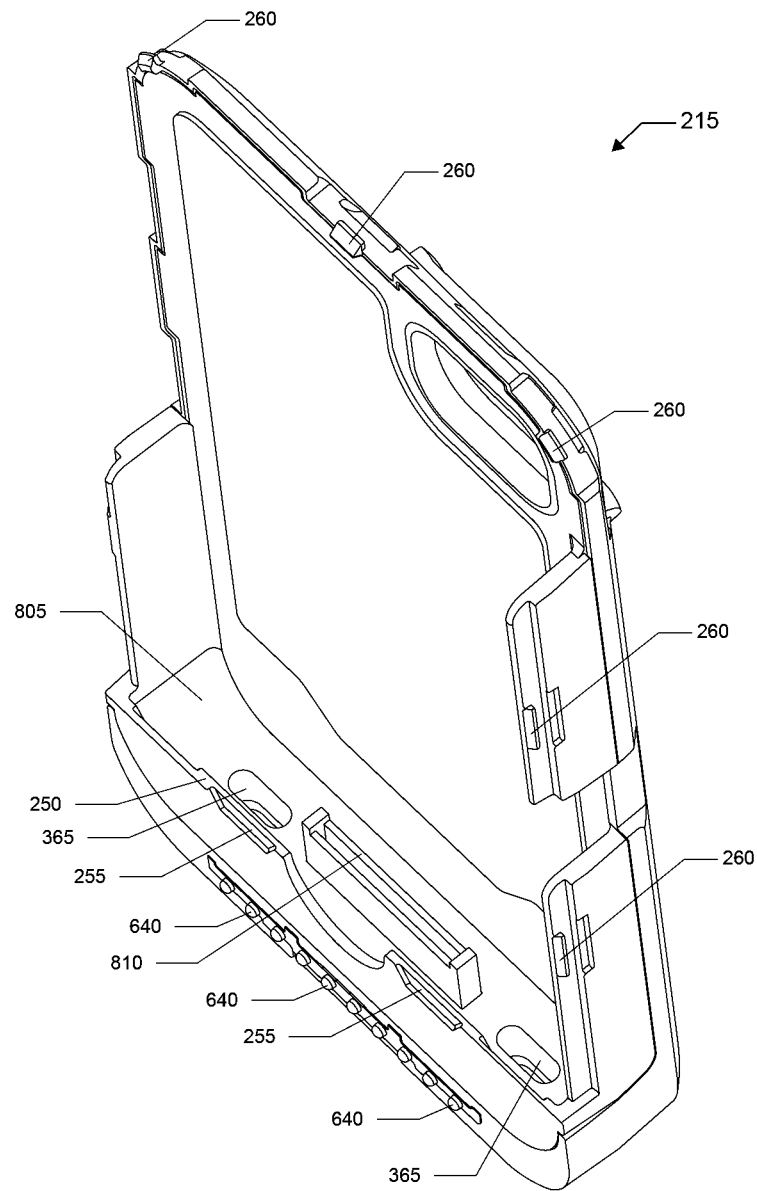
FIG. 8 is a front perspective view of a back shell of a protective enclosure for an electronic device.

In one example, the back shell 215 can wrap around a bottom side of the electronic device 205. The back shell 215 can include a cavity 805, as shown in FIG. 8, which is configured to receive a bottom portion of the electronic device 205. The electronic device 205, which can be a smartphone, can include a female connector 305 proximate a bottom side surface of the device. The cavity 805 of the hard shell case can include a male connector 810 configured to mate with the female connector 305 of the electronic device 205. The male connector 810 can be configured to transfer power and data to and from the electronic device 205. The type of male connector in the cavity can be determined by the type of electronic device 205 for which the protective enclosure 100 is designed to house. In one example where the protective enclosure 100 is configured to house an APPLE IPHONE, the male connector 805 can be APPLE'S proprietary 30-pin connector. In another example, a protective enclosure similar to protective enclosure 100 is configured to house a SAMSUNG smartphone.

The hard shell can include a membrane 310 to allow for operability of a touch screen 208 on the electronic device 205 when housed in the protective enclosure 100. For example, the front shell 210 can include a display opening that is covered by the membrane 310, which can be flexible or rigid. In one example, the membrane 310 can be made from a thin layer of polycarbonate (e.g. LEXAN), polyvinyl chloride (PVC), polyurethane, tempered glass, alkali-aluminosilicate sheet glass (e.g. GORILLA GLASS), or silicone that can be molded or formed, such as by thermoforming, casting, stretching, heating, or injection molding, or otherwise shaped to fit over the front surface of the electronic device 205 or other surfaces of the electronic device. The membrane 310 can have a thickness ranging from about 0.004 to 0.020 inches. The membrane 310 can be made from a single material or multiple materials that are welded, glued, or formed together into a single membrane. In one example, the membrane can include a privacy filter, such as a microlouver layer or other light control layer, to enhance visual security of information displayed on the screen of the electronic device. The privacy filter can make the screen of the electronic appear dark to any person not viewing the screen head on. For a portion of the membrane 310 that is disposed over the touch screen 208 of the electronic device 205, it can be desirable to use a clear, thin layer of glass or plastic to provide a clear, transparent material over the screen to protect the screen from scratches while also permitting operability of the touch screen. If the electronic device 205 includes a keyboard, a portion of the membrane 310 that covers the keyboard can be made of a thin layer of polycarbonate (e.g. LEXAN), PVC, polyurethane, or silicone that is flexible so that the keyboard or other buttons can be pressed through the membrane, which can provide a similar feel as using the keyboard without the membrane 310.

The protective enclosure 100 can include a stretchable cushion layer 220 over an outer surface of the hard shell. The stretchable cushion layer 220 can fit snugly over the assembled hard shell. The stretchable cushion layer 220 can provide cushioning to the electronic device 205 if it is dropped. The stretchable cushion layer 220 can be made of any suitable material, such as silicone rubber or thermoplastic elastomer (TPE), including silicone-based thermoplastic. The stretchable cushion layer 220 can be capable of stretching sufficiently to allow the hard shell to slide into a front opening 221 of the stretchable cushion layer.

The stretchable cushion layer 220 can attach to the hard shell by any suitable method of attachment, such as through one or more retention features. Positively attaching the stretchable cushion layer 220 to the hard shell can resist movement of the stretchable cushion layer 220 relative to the hard shell and can improve appearance and functionality of the protective case 100. In one example, as shown in FIG. 2, the front shell can include a groove 280. The groove 280 in the front shell 210 can extend around a perimeter of the display opening that, in one example, can be occupied by the membrane 310. The groove 280 can be continuous around the perimeter of the display opening in the front shell 210. Alternately, there can be a plurality of discontinuous grooves 280 located around the perimeter of the display opening in the front shell 210. The stretchable cushion layer 220 can include a tab (not shown) on an inner surface of the stretchable cushion layer extending around a perimeter of its front opening 221. In one example, the tab can be located on the inner surface of the stretchable cushion layer 220 and within about 0-0.2, 0-0.1, or 0-0.05 inch of the perimeter of the front opening 221.

The tab of the stretchable cushion layer 220 can be configured to mate with the groove 280 or grooves in the front shell 210. The tab can be continuous on the inner surface of the stretchable cushion layer 220 extending around the perimeter of the front opening 221. Alternately, there can be a plurality of discontinuous tabs located on the inner surface of the stretchable cushion layer 220 extending around the perimeter of the front opening 221. The tab can extend from an inner surface of the stretchable cushion layer 220 toward an inner volume of the stretchable cushion layer in a direction parallel to a side surface of the stretchable cushion layer. Upon assembling the stretchable cushion layer 220 over the hard case, the user can depress the tab into the groove by pressing a finger against a front surface of the stretchable cushion layer proximate each tab and around the perimeter of the front opening 221 Each tab and corresponding groove can have any suitable length or width. In one example, each tab can have a width of about 0.01-0.1, 0.01-0.05, or 0.01-0.03. The tab can be slightly wider than the groove to provide a friction fit, which can enhance retention of the tab within the groove. In addition, the tab can be made of a soft material with a relatively high coefficient of friction, such as silicone rubber or any thermoplastic elastomer, which can be slightly compressed as it is pressed into the groove. The compressed tab can exert an outward force against side surfaces of the groove, and due to its relatively high coefficient of friction, the soft material can resist movement of the tab relative to the groove. The end of each tab can be tapered to enhance ease of insertion of the tab into the groove and to enhance manufacturability of the stretchable cushion layer 220 by improving its mold release characteristics.

The hard shell can include retention features to resist relative movement of the stretchable cushion layer 220 with respect to the hard shell. As shown in FIGS. 2 and 3, the front shell 210 can include side tabs 285 that extend outwardly from the hard shell. Each side tab 285 can extend through a side opening 290 in the stretchable cushion layer 220. The side tabs 285 can anchor the stretchable cushion layer 220 and resist relative movement of the stretchable cushion layer 220 with respect to the hard shell. Each side tab 285 can have a length and width that is suitable to provide sufficient contact surface areas between the side opening 290 in the stretchable cushion layer 220 and the side tab 285 of the front shell 210 to resist relative movement of the stretchable cushion layer in either the lengthwise or widthwise direction. In one example, the side tab 285 can have a length and width of about 0.25 to 0.5, 0.25 to 1.0, or 0.25 to 2.0 in.

The stretchable cushion layer 220 can include buttons that can be depressed by a user to activate corresponding buttons or switches on the electronic device 205. Each button on the stretchable cushion layer 220 can include a protrusion on an inner surface of the stretchable cushion layer to improve the feel and effectiveness of the button. For example, for a volume control button 315 on the stretchable cushion layer 220, the inner surface of the stretchable cushion layer opposite the button can include a protrusion 222 extending inward from the inner surface of the stretchable cushion layer and through an opening in the hard shell. The protrusion 222 can be configured to depress a corresponding volume control button 311 on the electronic device 205. The protrusion 222 can be shaped to provide a feel that mimics the feel associated with actuating the button of the electronic device 205 when the device is not installed in the protective enclosure 100.

The stretchable cushion layer 220 can include one or more flaps 320 that can be opened and closed. The flaps 320 can provide access to ports, buttons, or features of the electronic device 205. For example, as shown in FIG. 2, the stretchable cushion layer 220 can include a flap 320 that provides access to a headphone jack 212 on the electronic device 205. As shown in FIG. 3, the stretchable cushion layer 220 can include a flap 320 that provides access to a female connector 325 attached to the protective enclosure 100. The female connector 325 can be any suitable connector that allows for transmission of power and data to and from the electronic device 205. In one example, as shown in FIG. 3, the female connector 325 can be a mini USB connector. The mini USB connector 325 can connect to a USB cable 230 that can allow the protective enclosure 100 to be connected to a computer, wall charger, or other device having a female USB port. Other types of connectors and cables are possible.

In one example, as shown in FIG. 3, an outer surface of the stretchable cushion layer 220 can include a surface texture made from a plurality of small cavities in an outer surface of the stretchable cushion layer. The surface texture can improve a user's grip on the protective enclosure 100 and thereby reduce the likelihood of dropping the device 205. The surface texture can also increase the surface area of the stretchable cushion layer and thereby improve heat transfer away from the protective enclosure 100 to reduce the operating temperature of the electronic device 205 within the protective enclosure, which may improve battery performance and life. Although a surface texture with cavities is shown in FIG. 3, this is not limiting. The surface texture can include any suitable surface geometry that increases the surface area of the stretchable cushion layer 220 when compared to a smooth surface. For example, the surface texture can include small raised posts, fins, or other protrusions extending from the stretchable cushion layer 220.

Figure 6:
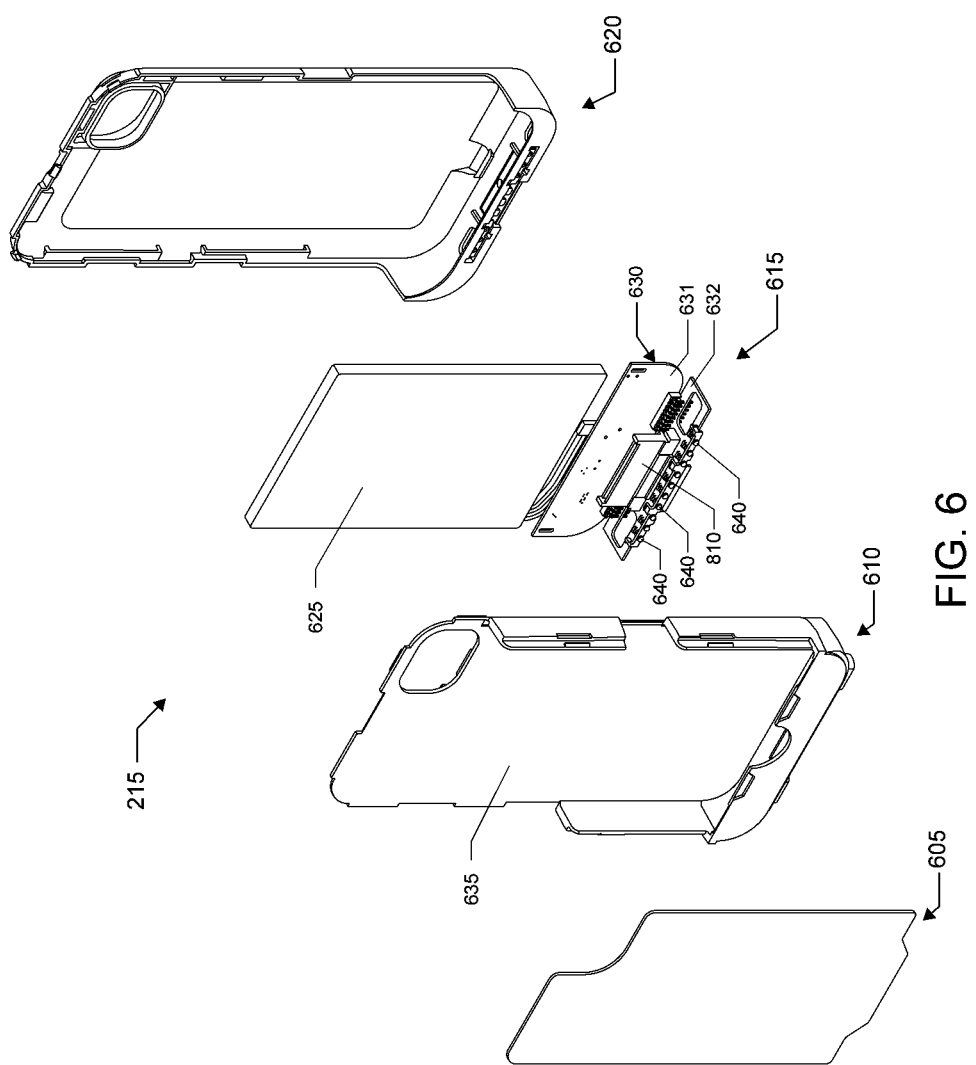
FIG. 6 is an exploded front perspective view of a back shell of a protective enclosure for an electronic device.

The back shell 215 can include an inner back shell 610 and an outer back shell 615 as shown in FIG. 6. A battery 625 can be located between the inner back shell 610 and the outer back shell 615. The battery 625 can be electrically connected to a circuit board 630 that interfaces with the electronic device 205 though the male connector 810. In one example, the circuit board 630 can include a main circuit board 631 and an interface circuit board 632, as shown in FIG. 6. The main circuit board 631 can be electrically connected to the interface circuit board 632, and the male connector 810 can be mounted on the interface circuit board.

The inner back shell 610 and outer back shell 615 can snap together to house the battery. Any suitable method of fastening the inner and outer back shells (610, 615) can be used including snaps, fasteners, adhesives, etc. An inner surface 635 of the inner back shell 610 can include a soft layer 605 that is configured to make contact with the back surface of the electronic device 205. The soft layer 605 can be made of any suitable material, such as foam, felt, or rubber, and can protect the electronic device 205 from scratches. The soft layer 605 can occupy a clearance volume between the electronic device 205 and the inner surface 635 of the inner back shell and thereby prevent the electronic device 205 from rattling inside the protective enclosure 100.

The battery 625 can be any suitable type of primary or rechargeable battery, such as an alkaline, carbon-zinc, nickel-metal hydride, lithium, lithium ion, or lithium polymer battery. The protective enclosure 100 can include a single battery or a plurality of batteries. The battery 625 can be permanently or semi-permanently sealed in the back shell 215 or it can be easily removable. In one example, the battery 625 can be removable and can be accessed without disassembling the protective enclosure 100. For example, the battery 625 can be inserted into the protective enclosure 100 through a battery slot (not shown). This can allow the user to easily replace a depleted battery with a fresh or newly recharged battery. In this example, the stretchable cushion layer 220 can include a flap (not shown) to protect and conceal the battery slot. The flap can prevent dirt or debris from entering the battery slot.

The battery 625 can be a single battery. Alternately, the battery 625 can be a plurality of batteries. Providing a protective enclosure 100 with a plurality of batteries can allow a first user to share power with a second user by swapping a charged battery for a depleted battery. For example, if a second user has depleted the batteries 625 in her protective enclosure, the first user can provide the second user with a charged battery from her protective enclosure 100. The battery 625 can have any suitable shape. For example, the battery can be a cuboid as shown in FIG. 6. Alternately, the battery can be a cylinder, hexagonal prism, triangular prism, or any other suitable shape. A protective enclosure having multiple batteries may also include multiple battery slots to accommodate the multiple batteries and to allow individual batteries to be removed or replaced.

The protective enclosure 100 may include a plurality of light emitting diodes (LEDs) 640. The LEDs can be electrically connected to the circuit board 630 of the protective enclosure 100. In one example, the LEDs 640 can be mounted on the circuit board 630, and light pipes can be used to transfer light from each LED to a location some distance away from the LEDs. The hard shell of the protective enclosure 100 can include an opening through which light from the LEDs can be transmitted. Likewise, the stretchable cushion layer can include one or more openings through which light from the LEDs is transmitted. In one example, the stretchable cushion layer 220 can include an LED opening 105 for each LED, as shown in FIG. 1.

The LEDs 640 can indicate the charge remaining in the protective enclosure's 100 battery 625, the electronic device's 205 battery, or both. For example, the LEDs can indicate a percentage of charge remaining in the battery or batteries. In particular, the protective enclosure can include five LEDs, and when the charge level of the battery or batteries is at forty percent, two LEDs may be illuminated. Alternately, the LEDs can indicate an estimated time remaining until one or both batteries are depleted. In particular, if the battery or batteries will become fully depleted in four hours, four LEDs may be illuminated. In this example, each LED represents one hour of battery life. Other time increments can also be used and may be selectable by a user within an application running on the electronic device 205. For instance, when the charge of the battery or batteries is low, such as below about twenty percent, each LED may indicate ten or fifteen minute increments to provide the user with more precise information about the actual charge level of the battery or batteries. This can allow the user to better monitor and manage power consumption when no recharging opportunities exist.

The protective enclosure 100 can be configured to fit into an optional holster 225. The optional holster 225 can include a belt clip 226 that can allow the holster to attach to clothing or other objects. The belt clip 226 can rotate with respect to the holster to provide the user with greater flexibility when positioning the holster 225. In one example, the belt clip 226 can include a ratcheting system to allow the belt clip 226 to rotate with respect to the holster 225 and to lock into various positions selectable by the user.

Figure 9:
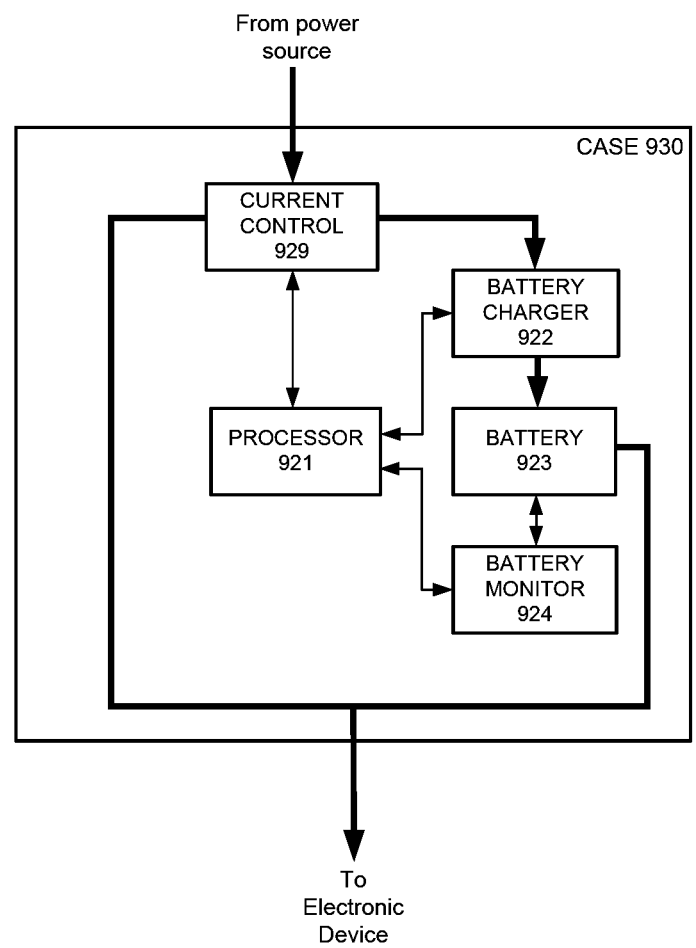
FIG. 9 illustrates a case for an electronic device with components for managing power in one embodiment of the techniques disclosed herein.

FIG. 9 is a block diagram for a case 930 for an electronic device with components for managing power in one embodiment of the techniques disclosed herein. Case 930 includes current control module 929, battery charger 922, case battery 923, battery monitor 924, and processor 921. Back shell 215 is an example of case 930, although other configurations are possible. The illustrated elements of case 930 may be included on one or more printed circuit boards such as circuit board 630, main circuit board 631, and/or interface circuit board 632. Case 930 may also include mechanical components and functions as illustrated in FIGS. 1-8 and the accompanying explanations.

Processor 921 may be any type of microcontroller, microprocessor, microcomputer, programmable logic device, reconfigurable circuit, or application specific circuit that is configured to communicate with other elements of case 930 to perform power management functions. In some situations, these power management functions may be described as 'intelligent' power management functions.

In some configurations, processor 921 may also communicate with an electronic device to which case 930 is attached, communicate with a power source, communicate with other devices, or with combinations thereof. Electronic device 205 is one example of an electronic device with which processor 921 communicates. Processor 921 may make use of computer executable program instructions that are stored in processor 921. Alternately, the computer executable program instructions may be stored in a separate memory device.

Battery 923 is a battery for supplying power to a device to which case 930 is attached. Battery 923 may use one or more of a variety of battery technologies including lithium ion (Li-ion), lithium ion polymer (Li-ion polymer), lead-acid, nickel cadmium (NiCd), nickel metal hydride (NiMH), nickel-zinc, alkaline, or others. Battery 923 stores chemical energy which can be converted into electrical energy and can be provided to an electronic device, such as electronic device 205, to which case 930 is attached. Battery 625 is one example of battery 923. In some configurations, battery 923 may not be contained within case 930 and case 930 may contain an interface and/or a slot to connect to an external battery similar to battery 923.

Although additional batteries are possible, for purposes of simplifying the discussion herein, the examples provided are generally limited to examples of cases with a single battery and electronic devices with a single battery. However, the solutions and techniques disclosed herein may be implemented in a fundamentally similar manner when the case and/or the electronic device have two or more batteries.

Battery charger 922 is a device, or collection of devices, for charging battery 923 using current received from current control module 929. Battery charger 922 may charge battery 923 by transitioning through multiple charging phases such as conditioning, constant current, and constant voltage. The state of battery charger 922, charging characteristics, or a charge mode may be commanded or controlled by processor 921. Processor 921 may also monitor the status of charging or charge activities through communication with battery charger 922. Battery charger 922 may be capable of charging battery 923 using different charging algorithms (i.e., fast charge, slow charge, etc.). Battery charger 922 may also perform thermal management functions with respect to the charging activities.

Battery monitor 924 is a device or group of devices for monitoring a condition of one or more batteries such as battery 923. Battery monitor 924 may be a microcontroller peripheral that provides battery charge/fuel gauging functions. Battery monitor 924 may use one or more known algorithms for fuel gauging and may provide information related to various parameters such as remaining battery capacity, present rate-of-use, state-of-charge (i.e., percentage remaining), run-time to empty, battery voltage, and/or battery temperature. Battery monitor 924 may be configured for or commanded to provide some or all of these types of information to processor 921. In addition, battery monitor 924 may be capable of being configured for or commanded to these different modes by processor 921. In one configuration, battery monitor may be integrated with or into battery charger 922.

Current control module 929 is a device that can be configured for or commanded to limit or restrict the amount of current that is drawn from or flows from a power source attached to case 930. Current control module 929 may also be configured to control or limit the amount of current that flows from individual outputs of current control module 929, such as to an electronic device and to battery charger 922. Current control module 929 may be pre-programmed to perform these functions or may be configured for or commanded to perform these functions by processor 921. Current control module 929 may also limit surges of current when power is applied to or removed from case 930.

In one example of operation, processor 921 determines an amount of source current available from a power source providing power to case 930. While some power sources may actually supply more power than they are specified to provide, drawing current from a source beyond the source's specified capabilities may damage the power source or damage the device that is hosting the power source (i.e., a computer hosting a USB port from which power is being drawn). Determining how much current is available from a power source may be accomplished using one or more of several methods including: determining a type of the power source based on the type of connector used, determining a type of the power source based on information received about the power source, determining a type of the power source based on other characteristics of the power source, or determining the maximum capability of the power source through trial and error testing. Each of these four methods is discussed in detail below.

A first method for determining how much current is available from a power source is to use a default value based on the type of connector that is used to connect to the power source. For example, if the power is supplied to case 930 through a USB connector, processor 921 may use a default current limit of 500 mA for the current source. The power source may be treated as only being able to provide this amount of current, based on the connection type, even though the power source may actually be capable of providing higher levels of current. For example, a charger using a USB connector may be capable of providing more current than is required by the USB standard.

A second method of determining how much current is available from a power source is to determine a type of the power source based on information or data received about the power source. For instance, processor 921 may receive information, through communication with the power source or another device, indicating that the power source is capable of supplying up to a specified maximum amount of current. Processor 921 then uses this information to direct current control module 929 to limit the total current drawn from the current source. The total current includes current used by battery charger 922, current used to operate other components of case 930, and current directed to an electronic device attached to case 930.

A third method of determining how much current is available from the power source is to determine a type of the power source based on a characteristic of the power source or information provided by the power source. The power source may communicate information about its identity or characteristics to case 930 or another host device. In the case of a power source connected using a USB connector, the data lines associated with the connector may not be otherwise used for delivering power and may be used to indicate capabilities of the power source. For example, APPLE IPHONE and IPOD chargers typically indicate the available current from the charger by applying specific voltages on the D+ and D− USB lines. When D+ and D− are both held at 2.0V, a device may use up to 500 mA of current from the power source. When D+ is held at 2.0V and D− is held at 2.7 V, a device may use up to 1 A of current from the charger. When D− is held at 2.0 V and D+ is held at 2.7 V, a device may use up to 2.1 A of current from the charger. When both D+ and D− are held at 2.7 V, a device may use up to 2.3 A of current from the charger. By detecting voltages on these data lines, or data pins, case 930 can determine a maximum amount of current to draw from the power source. In some situations, the voltages or states of D+ and D− may be propagated through case 930 and/or duplicated at a connector to an attached electronic device. This enables the electronic device to detect what type of power source is being used even though the electronic device is not directly connected to the power source. The power source may communicate it characteristics using one or more of the following communication techniques: digital communication, analog communication, wireless communication, proximity detection, or optical communication. Many other configurations and methods of detecting characteristics of or information about the power source are possible.

A power source may use D+ and D− to indicate capabilities of the power source, as described above, in a temporary or permanent manner. For example, the power source may indicate the capabilities, and/or other characteristics, of the power source by asserting predetermined voltages on the D+ and/or D− lines, as described above, throughout the entire period of time the power source is connected to a device. Alternately, the power source may assert these voltages on the D+ and D− lines for only a shortened period of time. In one example, the power source asserts the capability indicating voltages for a predetermined number of seconds when a device is initially connected and then reverts to using the D+ and/or the D− line for other purposes, such as transferring data.

A fourth method of determining a maximum current limit or other power capabilities of a power source is by conducting trial and error testing. A host device using power from a power source may iteratively draw increasing levels of power or current from the power source until there is an indication that the power source is reaching or has reached its maximum capabilities. In one case, the indication that the power source is nearing its maximum capability may be indicated by the power source having difficulty maintaining a supply voltage. For example, if a power source is supplying power at 5V and is having difficulty meeting increasing current requirements, the supply voltage may begin dropping to 4.9V, 4.8V, or lower. By gradually increasing the current draw from the power source and detecting changes in the supply voltage, or some other characteristic of the supplied power, the host can the determine a maximum current draw for the power source.

In another situation, a maximum capability of a power source may be indicated when the power source reaches a failsafe or circuit breaker mode. For example, some power sources are designed with protection capabilities that limit or discontinue output from the power source if a maximum power, voltage, or current draw is exceeded. A device using power from the source can experimentally determine this maximum power or current capability by gradually increasing current or power draw from the power source until a failsafe of circuit breaker limit of this type is reached and then set a maximum power or current draw value for the power source at an amount that is less than the identified failsafe or circuit breaker limit. In some situations, the power source may have to be reset, rebooted, or be otherwise reconfigured after it has reached a failsafe or circuit breaker limit.

Processor 921 may also configure or command current control module 929 to limit an amount of current that is delivered to each of several outputs of current control module 929. For example, in FIG. 9, current control module 929 has one output to battery charger 922 for charging battery 923 and one output which supplies power directly to an electronic device, such as electronic device 205. Case 930 may be configured to manage how power or current is distributed among one or more internal batteries and an electronic device attached to the case in a number of different ways, as will be described in detail below.

In one configuration, an electronic device connected to case 930 is permitted to consume as much of the available current from the power source as it can consume, up to a maximum current limit which has been determined by processor 921 and is being controlled by current control module 929. If the electronic device is consuming less current than the maximum current limit, processor 921 then commands current control module 929 to permit the balance of the available current (i.e., the current limit minus the current being used by the electronic device) to be sent to battery charger 922 for charging battery 923. The amount of current consumed by the electronic device may be monitored by current control module 929 or by a different current monitoring device within case 930. In this way, the electronic device is permitted to use the maximum amount of current it can consume for charging its internal battery while using any remaining available current for charging battery 923 in case 930 and without exceeding the maximum current available from the source. In determining the balance of the available current, the current consumed by other components of case 930 may also be taken into account In the configuration described above, the current drawn from the power source is limited to the maximum value designated for that power source, but the current path from the power source to the electronic device is not limited to any specific amount below that maximum value. Presuming the current consumption of the electronic device does not exceed the maximum limit for the power source, the electronic device uses, in this configuration, essentially the same amount of current and charges at approximately the same rate as it would if it were connected directly to the power source. This allows the electronic device to be charged at the maximum rate which is safe for the power source while making use of any additional current which is not being used by the electronic device to charge battery 923.

In another configuration, the current supplied to the electronic device from a power source is limited by case 930 to a maximum value that is less than the maximum that can be drawn from the power source. For example, a power source connected to case 930 may be specified for supplying 1 A of current. However, case 930 may limit the amount of current supplied to the electronic device to a lower value. This limitation may be imposed in order to preserve current for charging of battery 923, or for other reasons such as for thermal control. This type of control over current allocation allows case 930 to control the rate at which the electronic device is charged while reserving a designated portion of the current to charging battery 923. In this way, battery 923 and a battery in the electronic device can be charged simultaneously. The charging rate for a device or battery may be expressed as an amount of current (i.e., 400 milliamperes), an amount of power (i.e., 800 milliwatts), an estimated to reach full charge (i.e., full charge in 45 minutes or less), or a change in charge state per unit time (i.e., 20% increase in charge state in 15 minutes).

Also, the rate of charge of each of these two batteries and/or the relative priority of their charging can be controlled by controlling how much current will be allocated to each. While the current delivered to the electronic device is primarily described as current for charging the battery of the electronic device, it should be understood that current delivered to the electronic device may also be used to operate the electronic device and/or charge the battery of the electronic device depending on the state of the electronic device and the state of the battery of the electronic device.

In some situations, current control module 929 may not limit the current that flows from the power source directly to an electronic device attached to case 930, but may simply act as a current measuring device which provides an indication of how much current the electronic device is using. Similar to previous examples, this information may be used to determine how much additional current is available for and should be allocated to battery charger 922 for purposes of charging battery 923.

While many of the functions of case 930 are described as being controlled by processor 921, it should be understood that a microprocessor is not required to perform the techniques described here. The techniques may also be performed by a logic state machine, an application specific integrated circuit, and/or electrical circuitry configured for these purposes.

In FIG. 9, the determination regarding how the available current will be allocated among the electronic device and battery charger 922 (for charging battery 923) may be based on a variety of static and/or dynamic factors. These factors may include: the charge state of battery 923, the charge state of the battery of the electronic device, the capacity of battery 923, the capacity of the battery of the electronic device, the type of battery (for example, chemistry or physical arrangement), the kind of charger (wired vs. non-contact chargers), charging rates of one or more of the batteries, ages of one or more of the batteries, numbers of charging cycles the batteries have endured, the temperature of one or more of the batteries, another factor indicating health or condition of one or more of the batteries, the quantity of current available from the power source, historical usage patterns of the electronic device, user preferences, user input, or combinations thereof. A charge state of a battery may include the current charge level as a percentage of the battery's full capacity and may also include other information indicative of the battery's health or capabilities. Some or all of this information may be obtained from the electronic device and/or from a software application running on the electronic device which gathers this information.

The allocation of the current may be changed when case 930 is connected to a new power source and/or to a power source of a different capacity. The various factors listed above may also be monitored on an ongoing or periodic basis during the charging and the allocation of current may be changed based on changing circumstances as indicated by changes in one or more of the factors listed above.

Figure 10:
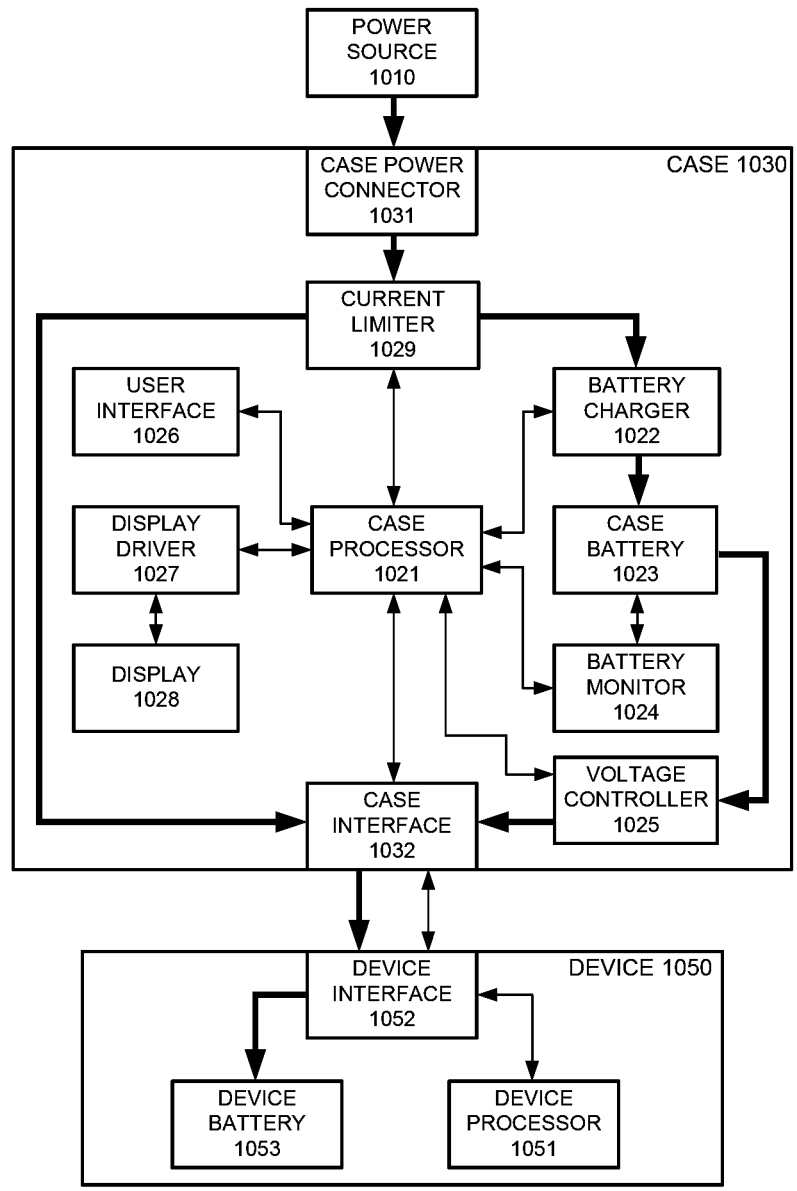
FIG. 10 illustrates a case interfaced to a power source and a device in one embodiment of the techniques disclosed herein.

FIG. 10 illustrates a case 1030 interfaced to power source 1010 and device 1050 in one embodiment of the techniques disclosed herein. Back shell 215 is an example of case 1030. Some or all of the electrical components of case 1030 may be included on one or more printed circuit boards such as circuit board 630, main circuit board 631, and/or interface circuit board 632.

Device 1050 may be a cellular phone, smartphone, mobile communication device, mobile computing device, tablet, portable computer, personal video player, electronic media reader, audio player, handheld scanner, camera, GPS device, or electronic computing or communication device of another type. In one specific example, device 1050 may be an APPLE IPHONE. Electronic device 205 is an example of device 1050. Device 1050 includes device interface 1052, device battery 1053, and device processor 1051. Device processor 1051 may be any type of microcontroller, microprocessor, microcomputer, analog computer, programmable logic device, reconfigurable circuit, or application specific circuit that is configured to operate device 1050 or a portion of device 1050. Device battery 1053 is a rechargeable battery that is integrated within or attached to device 1050.

Device interface 1052 provides an electrical interface between device 1050 and a cable or device. Female connector 305 is an example of device interface 1052. Device interface 1052 includes electrical conductors for providing power to charge device battery 1053 as well as, in some situations, control and data lines for communicating with device processor 1051 or other components of device 1050. In one example, device interface 1052 may comprise an APPLE 30 pin connector. In another situation, device interface 1052 may comprise an APPLE LIGHTNING connector. In yet another example, device interface 1052 may be an industry standardized connector or a proprietary connector or interface associated with another device manufacturer.

Case interface 1032 comprises an electrical and mechanical interface that is compatible with and mates with device interface 1052. Case interface 1032 enables power, and in some situations communications, to be exchanged between case 1030 and device 1050. Male connector 810 is an example of case interface 1032 although other interfaces and/or connectors are possible.

In some situations, case interface 1032 may have to meet certain requirements to be compatible with device 1050. For example, if device 1050 is an APPLE IPHONE, IPAD, or IPOD, case interface 1052 may have to meet the requirements of the APPLE Made for IPHONE/IPAD/IPOD (MFI) program. In addition, case interface 1032, or some other element of case 1030, may include an authentication chip or other type of electronic authentication device that may be necessary to establish communications between case 1030 and device 1050

Case 1030 may be designed and manufactured in variations each having a case interface 1032 that is configured to interface with different electronic devices or families of electronic devices. Each variation of case 1030 may include a different mechanical, electrical, and/or protocol interface for interacting with the one or a family of electronic devices that are compatible with that particular interface. For example, one implementation of case 1030 may have an interface and protocol capable of interfacing with a particular generation of IPHONE, while another implementation of case 1030 may have an interface capable of interfacing with a SAMSUNG mobile phone or tablet. In some situations, case processor 1021 may execute software which is customized for a particular electronic device or use parameters that are customized for a particular electronic device. If case 1030 is interfaced to an ANDROID-based phone or computing device, case interface 1032 may have to be compliant with ANDROID Open Accessory protocol, or a similar protocol for detecting and setting up communication between case 1030 and the phone or computing device.

Device 1050 will typically have many components in addition to those that are illustrated in FIG. 10, such as a display, a user interface, and/or communication components. For purposes of clarity, only those components of device 1050 that are most pertinent to the techniques and apparatuses described herein are illustrated in device 1050. However, it should be understood that the techniques and apparatuses described herein are not to be limited to any particular type or configuration of electronic device.

Power source 1010 comprises any source of power for charging case 1030 and/or device 1050. Power source 1010 could be a charger compatible device 1050 that is plugged into a wall outlet, an automobile charger for device 1050, a USB port, or any other type of electrical device that provides current at a designated voltage or in a designated voltage range. In some situations, power source 1010 may be integrated into another device, such as a USB port in a computer. Power source 1010 may be connected to case 1030 using a cable such as cable 230.

Case 1030 includes case processor 1021, battery charger 1022, case battery 1023, battery monitor 1024, voltage controller 1025, user interface 1026, display driver 1027, display 1028, current limiter 1029, case power connector 1031, and case interface 1032. Case processor 1021 is an example of processor 921. Battery charger 1022 is an example of battery charger 922. Case battery 1023 is an example of battery 923 or battery 625. Battery monitor 1024 is an example of battery monitor 924. Current limiter 1029 is an example of current control module 929. In addition to the functions described below, case 1030 also provides physical protection to device 1050. Physical protection may include protection from the effects of impact, shock, scratching, puncture, liquids, dust, sunlight, or other forces which could potentially damage or affect the operation of device 1050.

Case power connector 1031 is any type of electromechanical connector that allows power source 1010 to be electrically interconnected to case 1030. Case power connector 1031 may comprise a USB connector, a mini USB connector, a micro USB connector, a cylindrical connector, or a connector of another type, including combinations thereof. Case power connector 1031 may also include conductors for communication and/or transfer of data enabling power source 1010, or another device, to communicate with case processor 1021. Female connector 325 is an example of case power connector 1031.

In some cases, case power connector 1031 may support other functions when not connected to a power source. For example, case power connector 1031 may also be configured to support communication between device 1050 and an input device or peripheral such as: an external keyboard, a mouse, a display, a GPS device, a mobile phone, a smartphone, a computing device, or a combination thereof. In some cases, in addition supporting the communication between one or more of these devices and device 1050, case 1030 may also supply power to one or more of these devices through case power connector 1031. In some configurations, case power connector 1031 may also support data communications between case 1030 and another computing device. In other situations, case power connector 1031 may comprise circuitry for receiving power from power source 1010 inductively.

Display 1028 comprises any device for visually conveying information to a user of case 1030 and/or device 1050. Display 1028 may include one or more of: a light emitting diode (LED), an organic light emitting diode (OLED), a liquid crystal display (LCD), electronic paper, electrophoretic ink, another type of device for visually conveying information to a user, or combination thereof. Display 1028 may be made up of a group of discrete display elements, such as a group of LEDs. Display 1028 may also be made up of a single display device, such as an LCD, containing a group of display elements or segments. LEDs 640 are one example of display 1028. Information may also be communicated to a user using a haptic device, an audio device, a shaker, and/or a speaker.

Display 1028 may be used to convey to a user information about case 1030 and/or device 1050 including: a state or mode of case 1030, a state or mode of device 1050, a charge level of case battery 1023, a charge level of device battery 1053, and/or a combined charge level of case battery 1023 and device battery 1053. Display driver 1027 is a device for controlling, operating, driving, and/or managing the one or more elements which make up display 1028. User interface 1026 is any type of device for receiving input or a selection from a user of case 1030. User interface 1026 may be a switch, a button, a group of switches or buttons, a touchscreen, a proximity sensor, a keyboard, a keypad, a mouse, a trackball, a joystick, or a combination thereof.

In one example, display 1028 includes ten LEDs and display driver 1027 is an LED driver that drives the ten LEDs. In this example, user interface 1026 is a mechanically activated switch. When the switch is activated by a user, the ten LEDs provide an indication of the charge level of case battery 1023 and/or device battery 1053. In one configuration, the charge level may be indicated as a percentage of the total battery capacity, or estimated total battery capacity. For example, seven of the ten LEDs may be illuminated because the combined charge of case battery 1023 and device battery 1053 may be approximately 70% of the total capacity of those two batteries. In order to conserve battery power, the LEDs may only display this information for a brief period of time (i.e., a few seconds) before turning off. The charge for each of the batteries may also be displayed independently. For example, if device battery 1053 has 30% of its charge remaining and case battery 1023 has 90% of its charge remaining, case 1030 may alternate between illumination 3 of the LEDs and 9 of the LEDs. Many other display configurations and method of visually conveying information to a user are possible.

User interface 1026 may also be used for purposes other than activating display 1029. In one example, a user may hold down a switch associated with user interface 1026 for a predetermined number of seconds in order to reset case processor 1021 and/or other components of case 1030. In another example, one or more switches that make up user interface 1026 may be pressed in a predetermined pattern or sequence to change an operating mode of case processor 1021 and/or case 1030. Inputs to user interface 1026 may also be used to provide inputs to and/or change an operating mode of device 1050. Display 1028 may also be used to display information relating to the input of data through user interface 1026. For example, if user interface 1026 includes one or more switches which are used to select from among various settings or menu choices, LEDs which make up display 1028 may be used to indicate a menu item, a selection of a setting, and/or a current state of a menu item or setting.

In another variation, the charge information may be displayed as an estimated number of hours of use remaining. This estimated number of hours of use remaining may be determined based on information gathered by case processor 1021 and/or battery monitor 1024 regarding usage patterns over a period of time and power requirements associated with those usage patterns. For example, if it is estimated that there are seven hours of use remaining based on historical or expected usage patterns, seven of the ten LEDs may be illuminated. If there are more than ten hours of estimated time remaining and display 1028 includes only ten LEDs, display 1028 may convey this by successively illuminating differing numbers of the LEDs. For example, 14 hours of estimated use remaining may conveyed, when the user has activated the switch, by first illuminating ten LEDs and then subsequently illuminating only four LEDs.

The LEDs may also be operated differently when case 1030 is connected to and/or receiving power from power source 1010. For example, the LEDs may stay illuminated even though the switch has not been pressed, may fade on and off to indicate that charging is taking place, or may cycle on and off in other patterns to convey information about a state or mode of case 1030 and/or device 1050.

Case 1030 may also adjust the intensity of the LEDs at preset or user-defined times of day. For example, when connected to power source 1010, case 1030 may drive the LEDs at high intensity to indicate that charging is taking place while driving them at a lower intensity when charging is not taking place.

Case 1030 may also automatically reduce the intensity during the hours of 10 PM to 6 AM, or during another window of time, in order to avoid providing too much lighting to rooms which may often be darkened in this timeframe. This adjustment may also be based on a user-defined window of time in which lower intensity is preferred. In another variation, the LEDs may be dimmed based on input from a photosensor used to sense the level of ambient lighting in the room or based on input from a proximity sensor indicating when something (i.e., a user's face) is close to device 1050.

In another example, display 1028 may be used to display or convey other information associated with device 1050. In the example in which display 1028 comprises LEDs, the LEDs are typically used to display a charge state or charge remaining in one or more of the batteries. However, under certain circumstances, the LEDs could also be used to display an alert or other information associated with device 1050. For example, if device 1050 is a phone, the LEDs which make up display 1028 could be flashed brightly when there is an incoming call in order to better get the user's attention. In another example, one or more of the LEDs could be dimly illuminated when the display and all other indicators on device 1050 are turned off in order for a user to be able to more easily locate the device. Any information which device 1050 might potentially display or indicate using its own display or indicators, such as touch screen 208, could potentially be replaced or supplemented through display of information using display 1028 of case 1030. The information to be displayed can be communicated to case 1030 through communication with device processor 1051.

Many other types of input devices and display devices are known in the art and may be used to implement user interface 1026 and/or display 1028. The apparatuses, solutions, and techniques disclosed herein are not to be limited to any specific type of user input device, user interface, display device, method of receiving input from a user, or method of displaying information to a user.

Voltage controller 1025 is a device for adjusting the voltage of power output by case battery 1023 to device 1052. In one example, case battery 1023 and device battery 1053 are both 3.7 volt (3.7V) batteries. In this example, case 1030 is designed to receive power at 5 volts (5V) because some common interfaces (i.e., USB) are specified to provide power at 5V. Consequently, device 1050 may also be configured to receive power at 5V with that voltage being internally stepped down in device 1050 (not shown) before it is applied to device battery 1053. When charging case battery 1023, battery charger 1022, or another voltage regulation or adjustment device, steps down the 5V received from power source 1010 to an appropriate voltage for charging case battery 1023. Even though, in this example, case battery 1023 and device battery 1053 are both 3.7V batteries, current provided from case battery 1023 to device battery 1053 must be stepped up to 5V by voltage controller 1025 because 5V is expected at device interface 1052 and device 1050 has been otherwise designed to use current supplied at 5V to charge device battery 1053. Many other combinations of voltages are possible.

In addition to adjusting the voltage output from case 1030 to device 1050, voltage controller 1025 may also perform a switching function for the power delivered from case battery 1023 to device 1050. For example, depending on a selected charge profile and the states of case battery 1023 and device battery 1053, it may be desirable to prohibit current flow from case battery 1023 to device 1050 in some circumstances. For example, even though device battery 1053 is not at 100% charge and case 1030 is not connected to power source 1010, case 1030 may not deliver power from case battery 1023 to device 1050 until the charge level of device battery 1053 drops below a specified level (i.e., device battery 1053 drops below 60% charge).

In addition to stepping voltage up and/or down, voltage controller 1025 may also perform this switching function under the control of case processor 1021. Alternately, the switching function may be performed by a component of case 1030 separate from voltage controller 1025.

In addition to supplying power to device 1050, case 1030 communicates with device 1050 using case interface 1032 and device interface 1052. This communication may be used to manage and/or control various power and battery charging related functions and/or exchange data for other purposes. While the communication between case 1030 and device interface 1052 is illustrated as being conducted using the same interface and/or connector that is used to supply power to device 1050, it should be understood that this communication may also occur using a different interface and/or connector than is used to supply power from case 1030 to device 1050. Communication between case 1030 and device 1050 may occur through one or more different communication methods and/or protocols. For example, communication between case 1030 and device 1050 may occur using a wired connection, a wireless link, near field communication, magnetic communication, inductive communication, light wave communication, infrared communication, audio frequency communication, motion, device attitude, or a combination thereof.

Communication between case 1030 and device 1050 may be automatically established when they are connected or may be established only when communication between case 1030 and device 1050 is necessary. As used herein, the term 'communication' is intended to mean communicating data or information. The term 'communication' is not intended to include the supplying of power from one device to another. In some situations, case 1030 may interface to case 1050 in multiple ways. For example, case 1030 may transfer power to and communicate with an IPHONE using an APPLE 30 pin or LIGHTNING connector. In other situations, one connector may be used to transfer power from case 1030 to device 1050 while data communications between them occur through another connector (for example, through a headphone or microphone port) on device 1050.

In addition to the methods discussed above for controlling how much current an electronic device is permitted to consume, case 1030 may also command or direct device 1050 to use no more than a specified amount of current by sending a command or instruction using one or more of the communication methods described above. In some situations, case 1030 may send a command to device 1050, or another similar device such as electronic device 205, directing the device to consume a specified amount, or no more than a specified amount, of current. This command may be issued in the form of a specific current limit (i.e., 350 mA) or may be a selection of one of a small number of predefined charging levels (i.e., charging level 2 of 4).

In one example, even though device 1050 may be capable of consuming up to 750 mA of current, case 1030 may send a command, or other type of communication, to device 1050 instructing it to limit consumption to a lesser amount, 400 mA for example. This type of command may be used to limit the current consumed by device 1050 rather than by limiting it using current limiter 1029 or current control module 929 as described in previous examples. Existing electronic device case solutions do not provide a means of performing these types of communications between a case and the associated electronic device. Therefore, existing solutions do not provide these types of intelligent charging and power management features between a case and the associated electronic device.

Case 1030 may issue a command or use other communication with device 1050 to limit current to device 1050 for a number of reasons. In one example, case 1030 may limit the current to device 1050 in order to preserve some current for charging case battery 1023. In another example, case 1030 may limit current to device 1050 in order to protect power source 1010 from being overburdened. In another example, case 1030 may limit current to device 1050 in order to synchronize the charging of device battery 1053 and case battery 1023 such that they will both be finished charging at approximately the same time. This may include ongoing monitoring of the state of the two batteries and periodic adjustment of how current is allocated between the two in order to dynamically compensate for their changing states and/or charging rates. In another example, case 1030 may limit current to device 1050 for thermal management purposes. Case 1030 may limit the current in order to manage a temperature of device 1050, a temperature of a component of device 1050, a temperature of case 1030, a temperature of a component of case 1030, a temperature of power source 1010, or a combination thereof.

Case 1030 may also allocate current between itself and device 1050 based on how much current device 1050 is consuming. Case 1030 may use current limiter 1029, or a separate current measurement device within case 1030, to determine how much current device 1050 is consuming. In another configuration, device 1050 may determine how much current it is consuming and provide this information to case 1030. If device 1050 is currently in an active operational mode and consuming a relatively large amount of current, case 1030 may allocate a larger portion of the current available from power source 1010 to counterbalance the effects of device battery 1053 being depleted at a relatively high rate due to the operation of device 1050. The allocation may be dynamically adjusted based on how the electronic device is being used.

In some situations, case 1030 may control the allocation of current between case 1030 and device 1050 in accordance with a usage profile. A usage profile may be a default profile programmed into case 1030 or may be a set of user-defined or user-modified parameters. For example, a usage profile may indicate that a user always wishes for device battery 1053 to be fully charged before the charging of case battery 1023 begins. This configuration is convenient for a user who may periodically use device 1050 without case 1030 because device battery 1053 will always have the maximum possible charge, relative to case battery 1023. If device 1050 is disconnected from case 1030 and used independent of case 1030 for a period of time, it may potentially be used for a longer period of time in this mode because the charging of device battery 1053 has been maximized.

Because batteries may charge more efficiently or effectively when charged more slowly, case 1030 may also limit the amount of current allocated to case battery 1023 and/or device 1050 in order to accomplish a slower or more gradual charge cycle for one or more of the batteries, rather than using a larger amount of the available current to charge the batteries serially in time (i.e., direct all or most the available current to charge one of the batteries first and then divert the current to the second battery when the first is fully or nearly fully charged). When charged in this manner, case 1030 may be supplying less current to device 1050 than device 1050 would consume if connected directly to a power source.

In some situations, the slow charging approach described above may also involve communication between case 1030 and device 1050 regarding what type of charge cycle or charge mode is being used or is planned to be used. In one example, case 1030 may communicate with device 1050 to obtain information about device battery 1053 or preferred charging characteristics for device battery 1053. The selection of a charging mode may also be based on a usage profile, a user profile, environmental conditions, a type of power source 1010, a capacity of power source, 1010, or a combination thereof.

Case 1030 may also adjust the allocation of current to device 1050 based on the operational mode of device 1050. If device 1050 is operational and consuming current, case 1030 may allocate more current to device 1050 in order to provide current for device 1050 to operate as well as to charge device battery 1053. For example, it may be desirable to charge device battery 1053 using 500 mA of current. Case 1030 may provide 500 mA of current for this purpose, or may command device 1050 to only draw 500 mA, when device 1050 is in a standby, low power, or hibernate mode. However, if device 1050 is active and is consuming more power, case 1030 may change the allocation of current to device 1050 in order to accommodate the power usage of device 1050 while maintaining the charging of device battery 1053 at approximately the same rate as it had been charging when device 1050 was in standby, low power, or hibernate mode. In other words, case 1030 may adjust the amount of current supplied to device 1050 in order to keep the amount of current available for charging of device battery 1053 roughly constant while the operational mode of device 1050 is changing. Case 1030 may receive information about the operating mode of device 1050 through communication with device 1050 using one of the methods described above, by monitoring current consumption of device 1050, or by other means.

Case 1030 may also provide improved power management functions when attached to device 1050 with respect to the use or discharge of case battery 1023 and/or device battery 1053. Existing solutions may fully, or nearly fully, discharge one battery before use of the other begins. However, some types of batteries operate more efficiently (i.e., can provide more total power over time) when discharged more slowly. Consequently, using case battery 1023 and device battery 1053 to jointly, simultaneously satisfy the current needs of device 1050 may effectively increase the amount of power available from the two batteries thereby increasing the time that device 1050 can be used before recharging is necessary. In order to properly manage simultaneous battery use or discharge, case 1030 may communicate with device 1050 using one of the previously described methods to obtain information regarding one or more of the following: the current charge state of device battery 1053, a rate of current usage from device battery 1053 by device 1050, a total rate of current usage by device 1050, an operational mode of device 1050, or a combination thereof.

In some situations, case 1030 may toggle between the various charging and discharging operations modes described above based on a time of day and/or a day of week. For example, a user may often make heavier use of device 1050 during daytime and evening hours and infrequent use of device 1050 during night hours. Therefore, case 1030 may allocate available current from power source 1010 to case battery 1023 and device 1050 differently during these various periods. During periods of heavy use, a user may wish the maximum amount of current to be used to charge device battery 1053 before charging case battery 1053 in order to maximize the possible use time of device 1050, in the short term, if device 1050 is removed from case 1030. For example, if it is midday and device 1050 is attached to case 1030 and case 1030 is attached to a power source in a car while the user is making a 40 minute drive, it may be most beneficial to divert as much current as possible to charging device battery 1053. Doing so may result in, for example, device battery being charged to a 50% level during the drive rather than device battery 1053 being charged to 20% and case battery 1023 being charged to 25% during the drive if both were being charged. Because charging during the high use hours is more likely to be discontinued before both batteries are fully charged, directing more of the available current to device 1050 gives the user more flexibility to use the device for a longer period of time without being connected to case 1030 even though this may not be the most efficient or preferred charging mode when it is expected that case 1030 will be connected to a charger long enough to charge both batteries.

In contrast, during nighttime hours, it may be more likely that power source 1010 will remain connected for a longer period of times (i.e., while the user is sleeping). Therefore, during these periods it may be more efficient to simultaneously charge both batteries and/or charge one or more of the batteries using a lower charging current (i.e., a slower charge rate). This may result in a more complete charge while having little effect on flexibility because it is more likely case 1030 will remain connected to power source 1010 for a long enough time period to fully charge both batteries.

Various charging profiles may be created for different times of days, different days of week (i.e., Saturday charge behavior is different than weekdays). The profiles may be default profiles that are programmed into case 1030 or device 1050, may be default profiles that have been modified by a user, or may be user created profiles. Case 1030 may obtain the profiles or information about the profiles through communication with device 1050. In addition, case 1030 may retrieve information regarding the current time or day of week through communication with device 1050.

Case 1030 may make further charging or charging profile determinations based on other information received from device 1050. As described above, the usefulness of various charging profiles is dependent, at least in part, on how long case 1030 will remain connected to power source 1010. Therefore, case 1030 may access calendar or schedule information stored on device 1050 in making charge profile determinations. For example, if case 1030 is plugged into a charger at 12:45 PM, a default charge profile may be to attempt to fully charge device battery 1053 before charging case battery 1023 because it is less likely that the charger will remain attached for an extended period of time during this time of day (i.e., because the user may be driving to or from lunch). However, if the retrieved calendar information indicates that the user is in a meeting from noon to 10:30 PM, case 1030 may charge the batteries in slow charge and/or parallel charge mode (i.e., charge both batteries at the same time) in order to increase battery life and/or charge efficiency. This may be a preferred choice because, based on the calendar information, it appears that the user may be staying in the same place for another hour and forty-five minutes and therefore it is more likely device 1050 will remain connected to a charger for this period of time.

In one variation of the example above, case 1030 may indicate the current charge mode or profile to the user, either directly using display 1028, through another element of case 1030, or through an interface of device 1050, and give the user the option to switch to another charging mode or profile.

In another variation of the example above, case 1030 may obtain location information from device 1050 in order to make charging or charge profile selection decisions. Device 1050 may be capable of determining its own location or movement using a GPS receiver, using a gyroscope, through triangulation, through tower identification, or other means. Case 1030 may make charging or charging profile selection determinations using this information along with other information about the user. Case 1030 may obtain some or all of this information from device 1050. For example, if case 1030 is connected to power source 1010 at a residential location and is not moving or is connected to power source 1010 at a location that is known to be a residence of the user, a charging profile may be selected that is geared toward a longer charging cycle. Similarly, if the gathered information indicates that the device has a velocity above a threshold, it is likely being charged in a car and selecting a charging profile structured for periods in which the device will be attached for shorter periods of time may be more suitable.

In yet another variation, case 1030 may use device 1050 to access additional data used to make charging profile or charging level decisions. For example, case 1030 may identify a type of device battery 1053 and make use of communication capabilities of device 1050 to access information (i.e., at an Internet website) about one or more of the batteries such as preferred charging levels, charging rates, a preferred charging profile for a battery, information used in predicting the life, health, or discharge rate of a battery. Case 1030 may then use this information in conjunction with, or in place of, the various charge profile criteria discussed in the examples above. In some situations, it may be beneficial to charge device battery 1053 at a lower charging rate when it is near, or as it nears, full capacity. Consequently, case 1030 may determine a charging rate or charging current level such that it has an inverse relationship to the charge state, or percentage of full capacity, of the device battery 1053. The charging rate may be periodically adjusted as device battery 1053 and/or case battery 1023 are charged.

Case 1030 may also include capabilities to monitor its own power level and perform mode changes accordingly. In one example, case 1030 is connected to device 1050 but is not connected to power source 1010. Case 1030 monitors the level of case battery 1023 and deactivates or shuts down case 1030 when the level of case battery 1023 drops below a predetermined level. Case 1030 may be put into a sleep or hibernate mode or may be shut down entirely. In this way, device 1050 will no longer attempt to draw current from or communicate with case 1030 and device 1050 may operate, at least temporarily, as if it is not attached to case 1030 even though it may remain physically attached to case 1030.

A software application may be run on device processor 1051 of device 1050, or on a processor of another device such as electronic device 205, to monitor, configure, or view data associated with the various charging and power management features described herein. The software application may reside on case 1030 and be loaded from case 1030 to device 1050 when device 1050 is attached to case 1030. Alternately, case 1030 may provide instructions to device 1050 directing device 1050 to obtain the software application from another location. For example, when connected to device 1050, case 1030 may provide a universal resource locator (URL) to device 1050 which device 1050 can use to download to the application from a website or a server associated with the URL. The URL may also be associated with a manufacturer or supplier of device 1050, a manufacturer or supplier of case 1030, an application store, or download site from which the software application may be downloaded based on the URL.

In addition to the types of information described above, case 1030 may also provide other types of information to device 1050 or to a software application running on device 1050. For example, case 1030 may transmit one or more messages to device 1050 that include information such as: an indication that the supply of power from case 1030 to device 1050 is about to be cut, an indication that the level of current from case 1030 to device 1050 is about to be changed, information about power source 1010, and/or a status of case 1030.

Case 1030 may also communicate with other devices or systems using the communication capabilities of device 1050. For example, case 1030 may transmit a request to device 1050, or a software application running on device 1050. Then, the request is transmitted to a recipient by device 1050, such as to a server over a wireless communication network. Device 1050 may receive a response to the request and transmit that response to case 1030. In one example, the request may be for a firmware update for case 1030 and the response may include the firmware update.

In another example, historical charging and device usage information may be collected by case 1030 and/or device 1050 and transmitted to a recipient for analysis. Based on the historical information, the recipient may provide a new recommended charging profile, pattern, or algorithm that better suits that user's behaviors and usage patterns. Case 1030 receives, via device 1050, the new recommended charging profile, pattern, or algorithm and substitutes it for the previous one. In this way, case 1030 can optimize the charging algorithm for each user based on their actual usage patterns.

The software application may communicate with case 1030 in a variety of ways. In one example, the software application, running on device processor 1051, may communicate with case 1030 using device interface 1052. In another example, the software application may communicate directly only with device 1050 and rely on software or firmware contained in device 1050 to relay messages to or perform communications with case 1030.

In the situation where device 150 is a device designed or manufactured by APPLE, a software application running on device 1050 may communicate with case 1030 using the APPLE external accessory framework. The external accessory framework provides a conduit for communicating between APPLE devices and attached accessories. This conduit may be used to integrate accessory level features into software applications. Features or functions of case 1030 can be integrated into a software application, if any, running on case 1030 using this framework.

Communicating with an external accessory typically requires working closely with the accessory manufacturer to understand the services provided by that accessory. Manufacturers must build explicit support into their accessory hardware for communicating with iOS. As part of this support, an accessory must support at least one command protocol, which is a custom scheme for sending data back and forth between the accessory and an attached app.

In one example, the software application may be configured to display one or more of many different types of information for each battery including: battery type, battery capacity, current battery charge level, battery age, battery health, and number of charge/discharge cycles. In addition, the software application may also determine a power remaining metric, based on the charge remaining in each of the batteries, and display an estimated amount of operation time remaining for device 1050 based on the power remaining metric. The time remaining may be expressed as a percentage (i.e., 30% remaining) or as an amount of time (i.e., 2 hours and 45 minutes). The estimated amount of time remaining may be based on tracking how much power has been used over a recent period of time, a current operating mode of device 1050, other battery life prediction methods, battery health, or a combination thereof. The time remaining may be expressed as a combined figure which takes both batteries into account but also conveys how much of that total is provided by each of two or more batteries.

Figure 14:
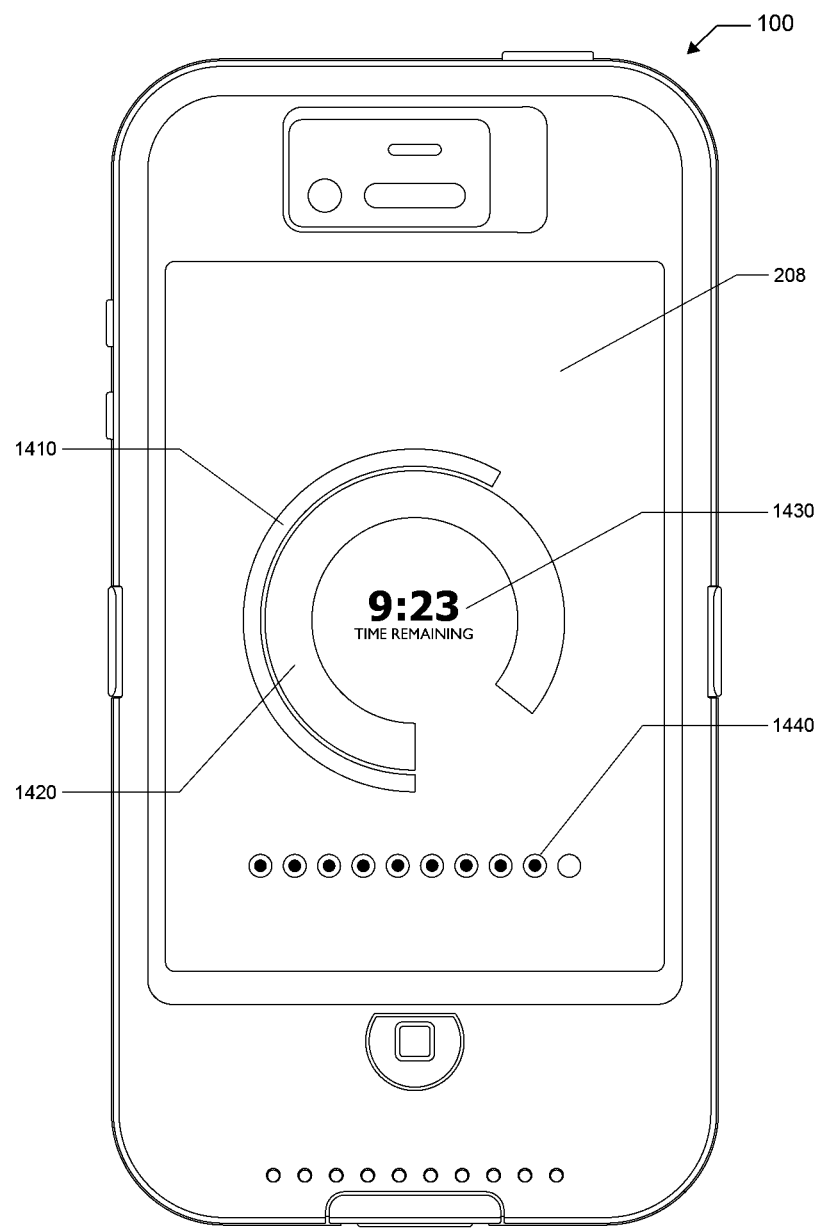
FIG. 14 illustrates an example of a power remaining display.

FIG. 14 illustrates one example of a power remaining display on touch screen 208 of an electronic device installed in protective enclosure 100. In the display, outer ring 1410 shows the power remaining in the battery in the electronic device. Inner ring 1420 shows the power remaining in the battery in protective enclosure 100. Estimated total time of use remaining 1430 is indicated in the middle of the display and is based on both batteries. In addition, touch screen 208 may also include graphical indicator 1440 which illustrates power remaining. Graphical indicator 1440 may mimic information displayed on LEDs The software application may also be configured to display information about the charger including: a type of the charger, how much current the charger is capable of providing, how much current the charger is currently providing, how long the charger has been connected, and/or an expected time until charging is completed.

Figure 15:
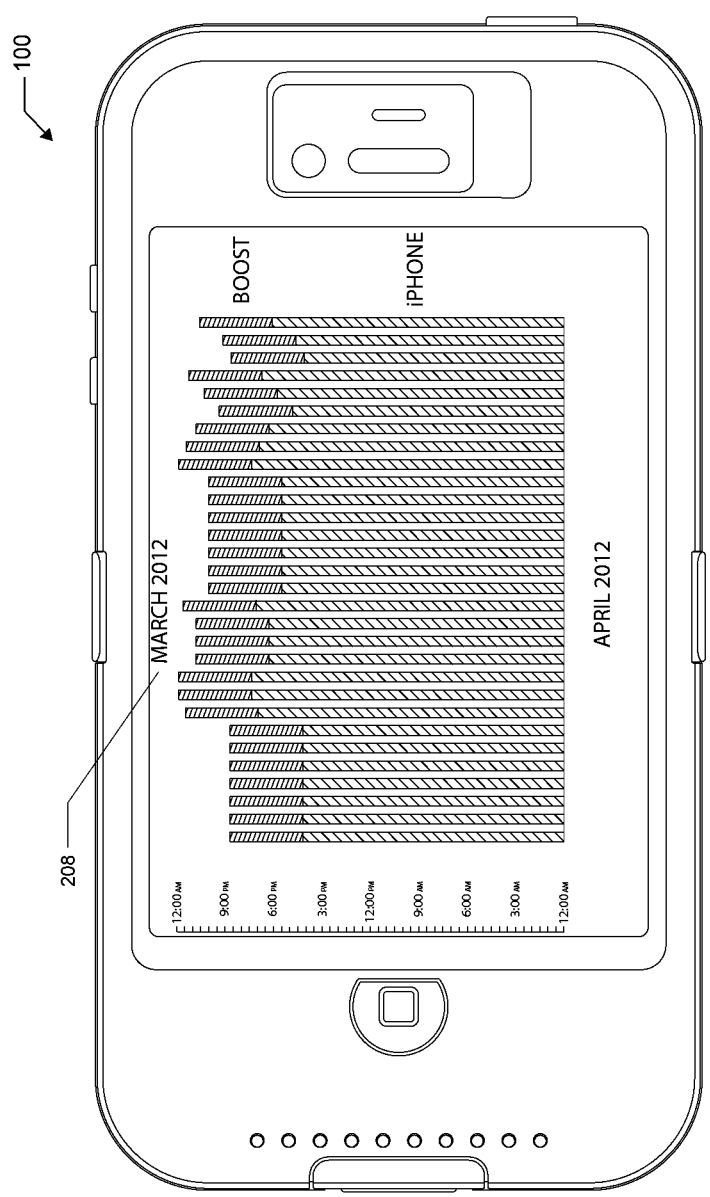
FIG. 15 illustrates an example of a daily power consumption display.

The software application may also track and display power usage over an extended period of time. In one example, the software application displays a bar graph for a week, a month, or another period of time, that illustrates, for each day in that period, how much power was consumed by device 1050, how much power was added through charging, and how much benefit was provided by case battery 1023 in case 1030. FIG. 15 illustrates one example of a daily power consumption display on touchscreen 2008 of an electronic device installed in protective enclosure 100. Each bar of the chart in FIG. 15 illustrates the power usage for a day of the month. Each bar is broken into two colors. One color illustrates the amount of power used by the device from its own battery while the other color illustrates the amount of power used by the device from the case battery. The display may also indicate the time of day that one or both of the batteries became depleted.

Figure 16:
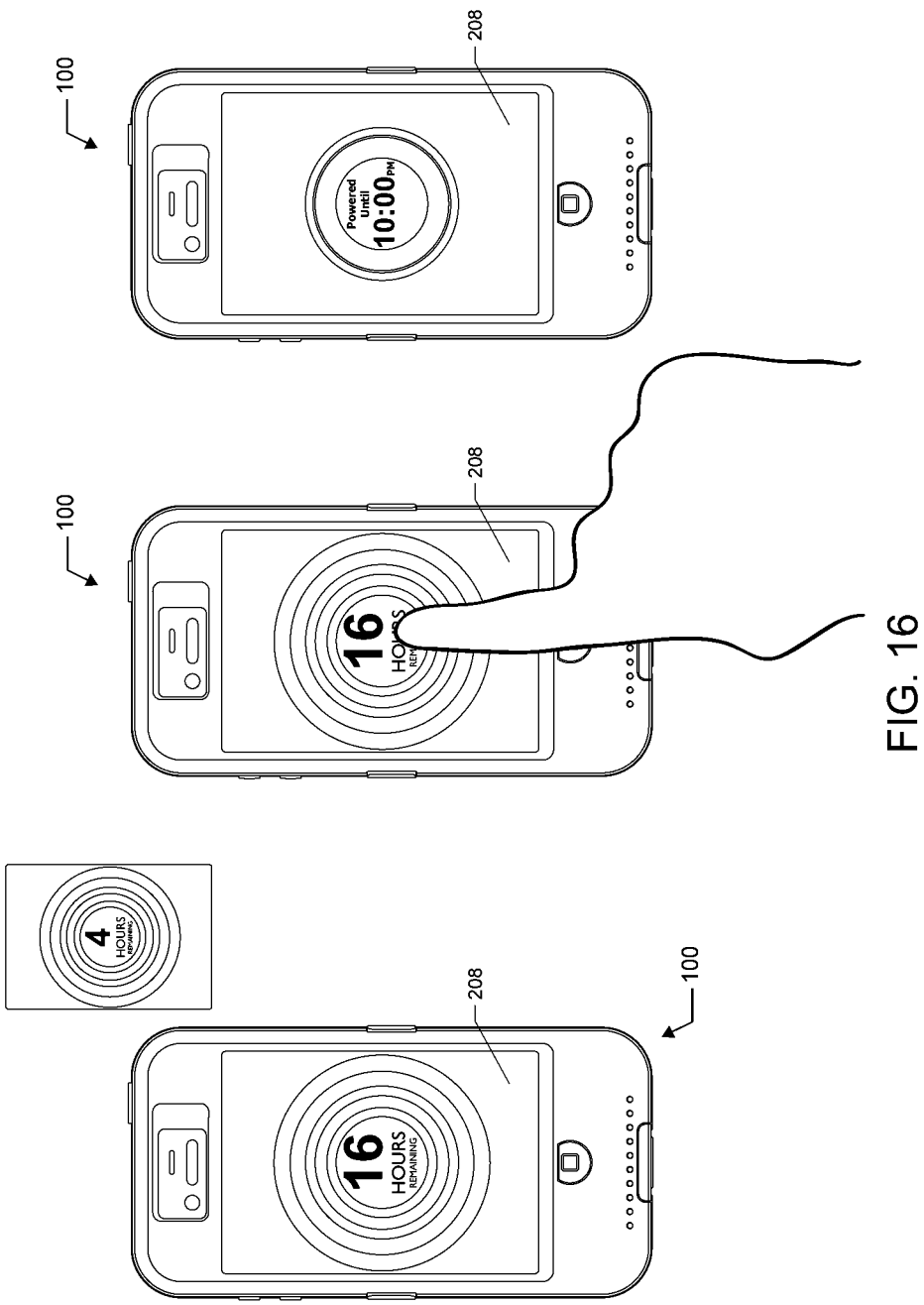
FIG. 16 illustrates alternate examples of power remaining displays.

In another example, FIG. 16 illustrates alternate example of power remaining displays on touch screen 208 of a device installed in protective enclosure 100. The display includes a number of hours remaining from both batteries and/or an estimate of the time of day to which the device will be operational based on the current battery levels and usage are displayed.

Figure 17:
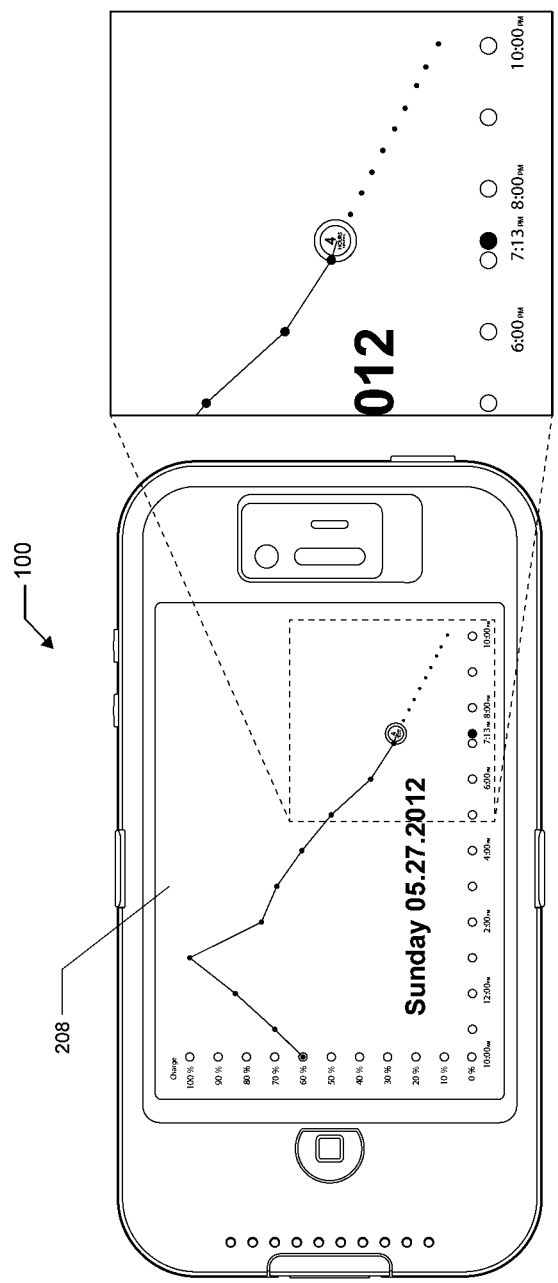
FIG. 17 illustrates an example of a power remaining versus time display.
Figure 18:
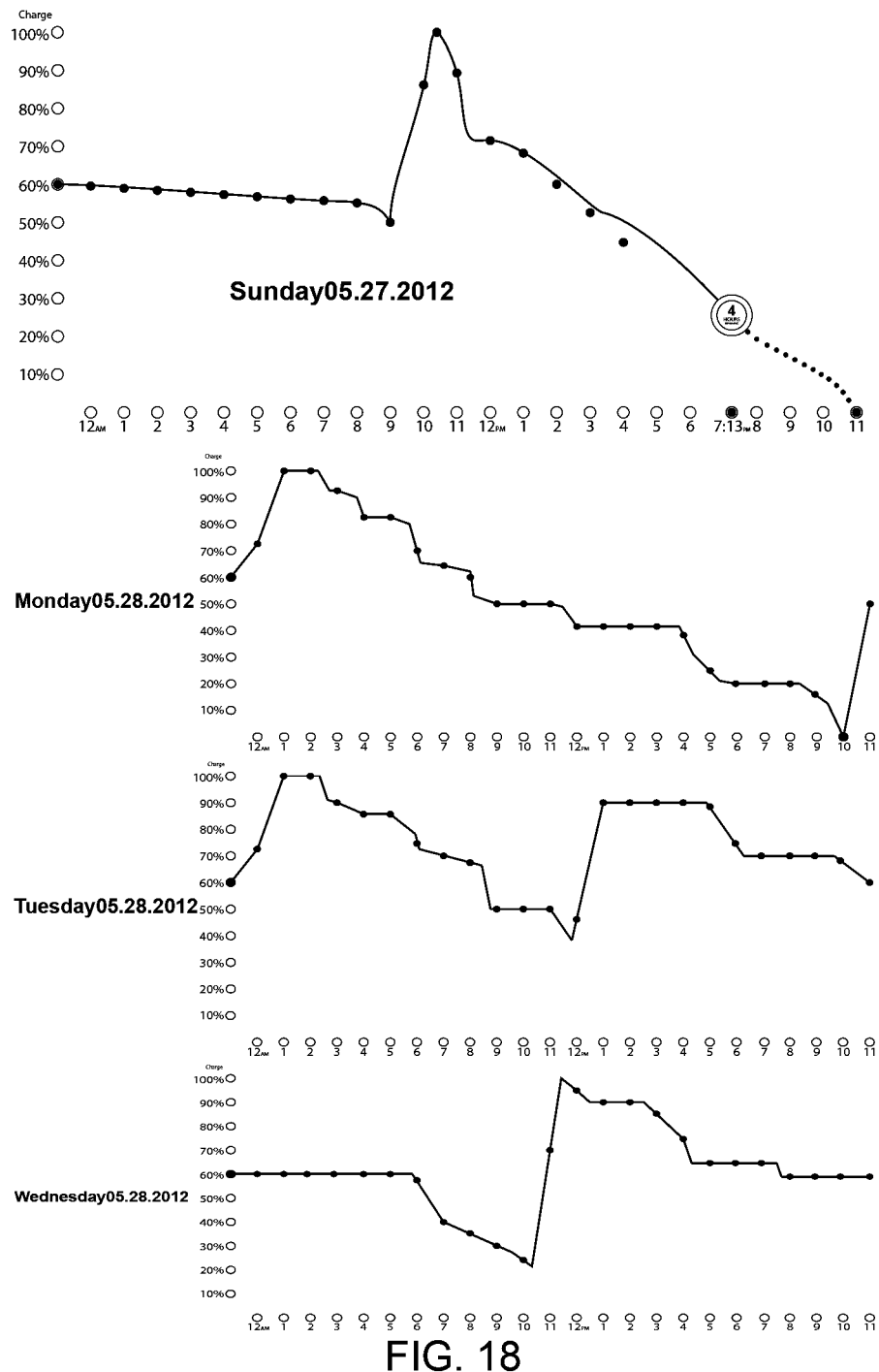
FIG. 18 illustrates alternate examples of power remaining displays.

In another example, an x-y line chart displayed on touch screen 208 of an electronic device installed in protective enclosure 100 illustrates the change in charge of one or multiple batteries versus time of day. FIG. 17 is an example of this type of display and also includes an estimate of the number of hours of charge remaining. FIG. 18 includes similar displays of charge remaining versus time of day for several other days. A user of the device may use this type of multi-day display to identify usage patterns, devise a charging strategy, and/or as input for defining a charging profile.

Many other formats for graphing or visually depicting charge and usage information are known in the art and the claimed apparatuses, solutions, and techniques are not to be limited to any particular depiction method.

In one variation, when the software application is running on device 1050 and device 1050 is not connected to case 1030, the software application may also display the additional power or use time that could potentially be obtained if device 1050 was connected to case 1030. In some situations, information about a manufacturer or supplier of case 1030 may also be displayed in conjunction with this information.

In another variation, the software application may communicate with other instances of the software application, or a similar software application, on another device. The communication may be for purposes of sharing charge profile information, transferring a user profile from one device to another, and/or sharing charge/discharge statistics.

Case 1030 may also include a solar cell or other alternate type of power source. A solar cell can be used to supplement the power needed to operate device 1050 and charge one or more of the batteries when case 1030 is exposed to light of a sufficient intensity top generate current from the solar cell. Case processor 1021, in conjunction with current limiter 1029, may be configured to allocate current from the solar cell among case 1030 and device 1050. When power source 1010 is connected to case 1030, case 1030 may perform these processes with respect to the combined current available from power source 1010 and the solar cell.

Some smartphones and computing devices have near field communication (NFC) capabilities. NFC is defined by a set of standards for radio frequency (RF) communication between two devices. NFC is related to radio-frequency identification (RFID) standards. Typically NFC enabled devices are able to communicate with each other after bringing them in close proximity (i.e., a few centimeters) to each other. In some situations, NFC communications may be used to set up or bootstrap a faster and/or more complex communication channel.

Case 1030, case 930, back shell 215, or any of the other embodiments described herein may also include an NFC repeater. For example case 1030 may include an NFC repeater (not shown) because some portion of case 1030 physically blocks or inhibits the lower power signal from the NFC coil or antenna that is built into device 1050. Because the effectiveness of NFC antenna of device 1050 may be significantly diminished when case 1030 is attached to device 1050, case 1030 may include a tune NFC repeater which repeats the signal from device 1050's NFC transceiver in an area of case 1030 that is not blocked, or is blocked to a lesser manner, by components of case 1030.

In one example, the NFC transceiver of electronic device 205 is positioned on the back of electronic device 205 near battery 625. Once electronic device 205 is attached to back shell 215, some of the power of the NFC transceiver may be block by battery 625. A tuned NFC repeater in back shell 215 may be located near and inductively coupled to the NFC transceiver and routed to the other side of battery 625 in order to provide an NFC signal that is not blocked or obscured by battery 625.

Figure 11:
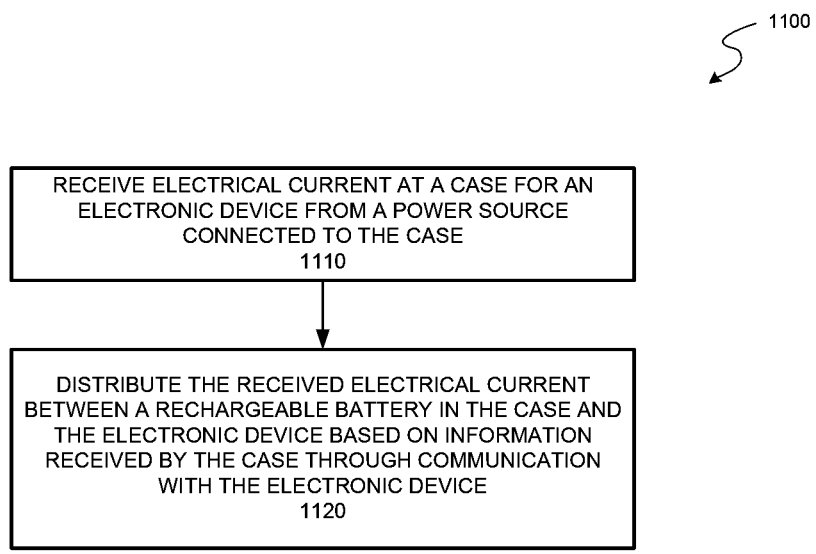
FIG. 11 illustrates a method of distributing current between a case and an electronic device in one embodiment of the techniques disclosed herein.

FIG. 11 illustrates a method of operating a case for an electronic device in one embodiment of the techniques disclosed herein. In step 1110 of FIG. 11, an electrical current is received at a case for an electronic device from a power source connected to the case. In step 1120, the received electrical current is distributed between a rechargeable battery in the case and the electronic device based on information received by the case through communication with the electronic device.

Figure 12:
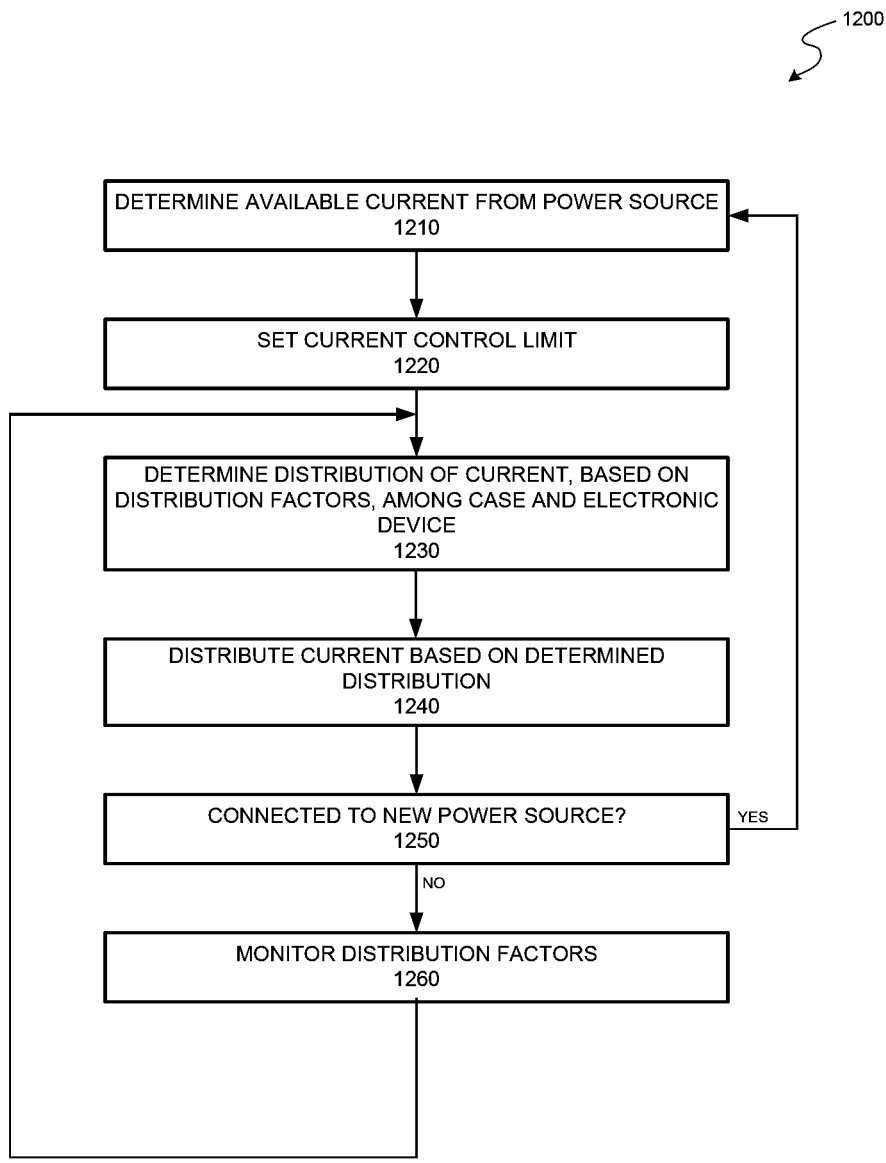
FIG. 12 illustrates an alternate method of distributing current between a case and an electronic device in another embodiment of the techniques disclosed herein.

FIG. 12 illustrates a method of operating a case for an electronic device in one embodiment of the techniques disclosed herein. In step 1210, an amount of current available from a power source is determined. In step 1220, a current control limit is set. In some situations, the current control limit is set based on the determined available current. At step 1230, a distribution of the current is determined among an electronic device and the case for the electronic device based on distribution factors. These distribution factors may include: a charge state of a battery in the case, a charge state of a battery in the electronic device, a capacity of one or both batteries, a charge rate of one or both batteries, an age of one or both batteries, numbers of charging cycles the batteries have endured, a temperature of one or both batteries, another factor indicating health or condition of one or both batteries, the quantity of current available from the power source, historical usage patterns of the electronic device, user preferences, user input, or combinations thereof.

In step 1240 of the method of FIG. 12, the current is distributed based on the determined distribution. In some situations, after current has been allocated or distributed to the electronic device, all of the remaining available current from the power source is distributed to the case and/or the case battery. In other situations, the total current consumed from the power source by the case, the electronic device, and any batteries being charged is less than the available current from the power source.

In step 1250 of the method of FIG. 12, a determination is made as to whether the case has been connected to a new power source. If it is connect to a new power source, the method returns to step 1210 and a determination is made regarding how much current is available from the new power source. If the case has not been connected to a new power source, the distribution factors continue to be monitored at step 1260. The distribution of current between the case and the electronic device may be dynamically adjusted as conditions change.

When a case is configured to charge a case battery and provide power to the electronic device simultaneously, a profile may indicate that both the case battery and a battery of the electronic device are to be charged simultaneously with a preference that they are charged at rates such that they reach full charge at approximately the same time. At the start of charging, the electronic battery may be 5% full and the case battery 30% full. At the start of charging, based on the distribution factors, 75% of the available charging current may be allocated to charging the electronic device battery while the remaining 25% is allocated to charging the case battery. However, after time, the electronic battery may be at 90% charge while the case battery has only reached 75%. In this situation, the allocation may be dynamically adjusted to divert more of the available current to the case battery.

Figure 13:
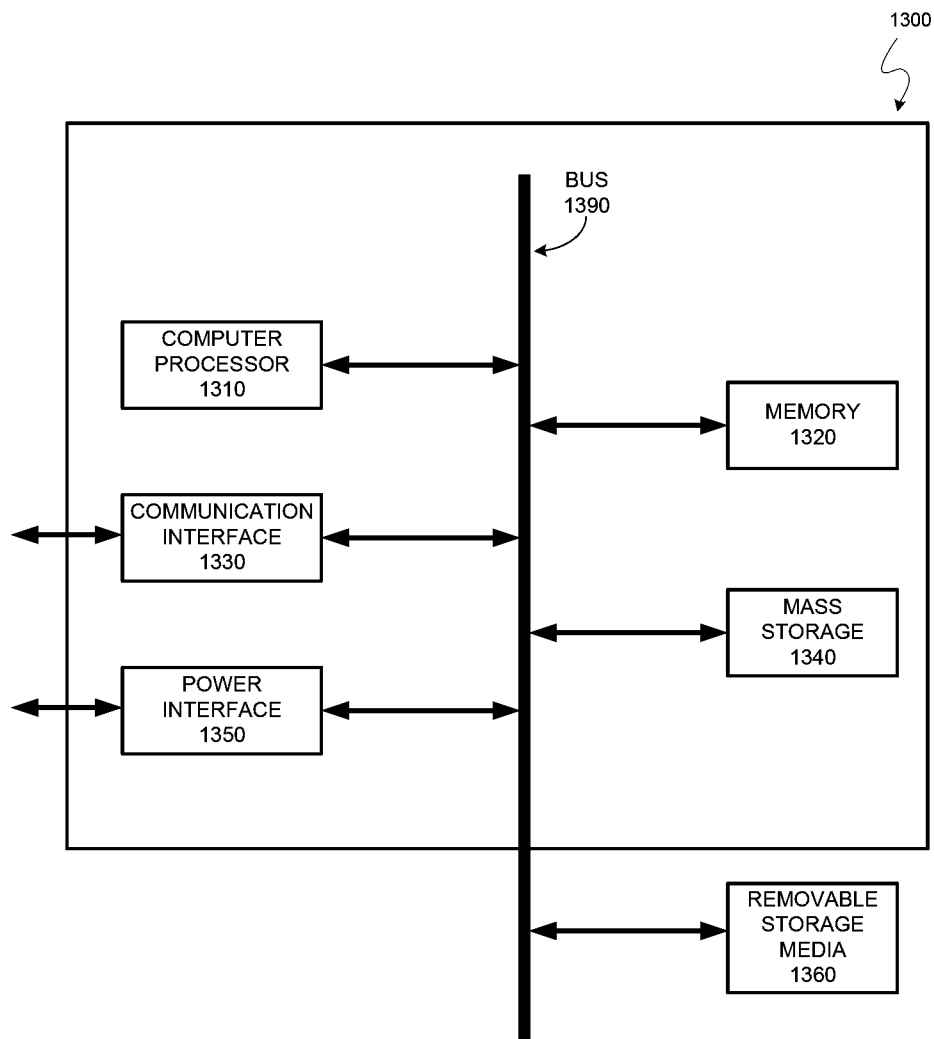
FIG. 13 illustrates a computer system for performing the techniques disclosed herein.

FIG. 13 illustrates computer system 1300 with which some embodiments of the techniques disclosed herein may be utilized. Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware. According to the example of FIG. 13, computer system 1300 includes a bus 1390, at least one computer processor 1310, at least one communication interface 1330, at least one memory 1320, at least one mass storage 1340, and at least one power interface 1350. A removable storage media 1360 also interface to bus 1390 of computer system 1300.

Computer processor 1310 can be any known computer processor, microprocessor, microcontroller, analog computing circuitry, programmable logic array, or programmable logic device. Computer processor 1310 may also interface to a coprocessor.

Communication interface 1330 can be any type of interface for communicating with another device or a network. Communication interface 1330 may be configured for communicating using a wired connection, a wireless connection, audio signals, light waves, infrared, or a combination thereof. Communication interface 1330 may be configured for communicating with or over a network such a Local Area Network (LAN), Wide Area Network (WAN), or any network to which computer system 1300 connects. Communication interface 1330 may also be configured to communicate with an electronic device such as a cellular phone, a smartphone, a tablet, a laptop computer, a server, or a digital audio device. The various functions of communication interface 1330 may be distributed across multiple communication interfaces. In one example, communication interface 1330 is a USB interface.

Memory 1320 can include random access memory (RAM), or any other type of dynamic data storage device commonly known in the art. Memory 1320 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 1310 or for another computer processor.

In some configurations, memory 1320 may be contained within computer processor 1310 or within one of the other elements of computer system 1300.

Mass storage 1340 can include one or more persistent mass data storage devices or modules that may be used to store data, information, and/or instructions. Mass storage 1340 may include a hard drive, a tape drive, an optical drive, flash memory, a micro electromechanical storage device, or a combination thereof.

Power interface 1350 can be any type of interface for receiving and/or transmitting electrical power. The functions of power interface 1350 may be spread across multiple power interfaces. The functions of power interface 1350 may also be combined into a single connector and/or interface with communication interface 1330. For example, the functions of communication interface 1330 and power interface 1350 may both be implemented in the form of one or more USB interfaces.

Removable storage media 1360 can be any kind of external data storage device including a hard drive, a memory card, a subscriber identity module (SIM) card, flash memory, an optical drive, a tape drive, a micro electromechanical storage device, or a combination thereof.

Bus 1390 communicatively couples the elements of computer system 1300, as well as removable storage media 1360. Bus 1390 may conform to an industry standard bus architecture and protocol or may use a proprietary architecture and/or protocol.

Figure 19:
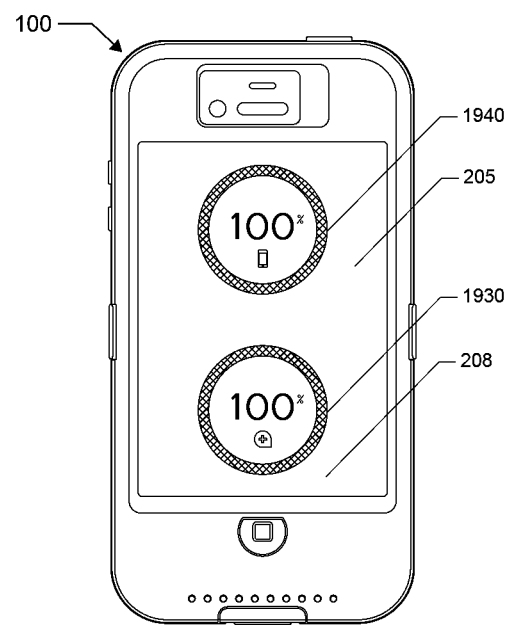
FIG. 19 illustrates an example of displaying battery charge information.

FIG. 19 illustrates an example of displaying battery charge information in one variation of the techniques disclosed herein. In FIG. 19, protective enclosure 100 is attached to electronic device 205. As explained in some of the examples above, electronic device 205 includes an internal battery. Protective enclosure 100 also includes a battery. A software application may be run on electronic device 205 to gather and display, on touch screen 208 of electronic device 205, information about the charge states of the batteries. The information may be displayed in the form of a graphical illustration or representation of the information. For example, the software application may display indicator 1930 which indicates a charge state of the battery of protective enclosure 100 and display indicator 1940 which indicates a charge state of the internal battery of electronic device 205.

In the example of FIG. 19, both batteries are fully charged. The respective indicators indicate the fully charged state for each of the batteries by displaying a value of "100%." In addition, the perimeters of indicators 1930 and 1940 are shaded to indicate that the batteries are fully charged. A user of electronic device 205 can view the information displayed on touch screen 208 and easily determine the current charge state of each of the batteries by either viewing the displayed percentage or by viewing the portion of the perimeter of the indicator that is shaded. Indicator 1930 and/or indicator 1940 may include an icon, text, or other information indicating which battery the indicator is associated with. For example, indicator 1940 includes an icon of a phone to convey that it is indicating the charge state of the internal battery of electronic device 205.

Although the examples here are described primarily with respect to an internal battery of electronic device 205 and a supplemental battery in protective enclosure 100, the disclosed techniques are also applicable to configurations in which neither battery is internal to electronic device 205, as well as to configurations in which three or more batteries are electrically connected to electronic device 205. Additional indicators that are similar to indicators 1930 and 1940 may be included to indicate the charge state of additional batteries, if any. In some situations, all of the indicators may be displayed on touch screen 205 at the same time. In other situations, one or more of the indicators may be displayed on a different screen. When the indicators span multiple screens, the software application may periodically switch between the indicator screens or a user may toggle between the displays manually. Many other methods of graphically indicating a charge state of one or more batteries are possible and the techniques disclosed herein are not intended to be limited to any particular visual or graphical display technique or mechanism.

Figure 20:
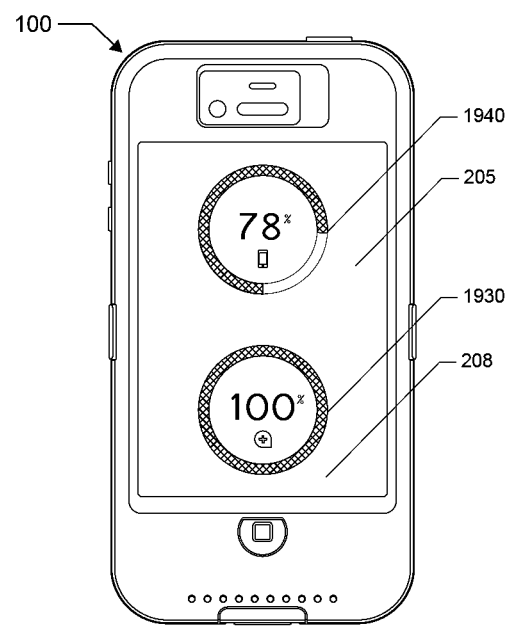
FIG. 20 illustrates an example of displaying battery charge information when one battery is not fully charged.

FIG. 20 illustrates an example of displaying battery charge information when one of the batteries is not fully charged. Indicator 1930 is unchanged from FIG. 19 because the battery associated with indicator 1930 is still fully charged. However, indicator 1940 indicates that the battery of electronic device 205 is now at less than a fully charged stated. Specifically, indicator 1940 indicates that the battery of electronic device 205 is at 78% of charge by displaying a value of "78%," as well as by shading only a portion of the perimeter of indicator 1940 that is representative of 78% of the full perimeter.

In some configurations, the perimeter of the indicator may be shaded in discrete increments that approximate, but do not necessarily exactly equal, the displayed percentage. For example, the perimeter area may be segregated into 10 discrete sections with 8 of those 10 sections being shaded or highlighted when the battery is at 78% charge. In another example, the perimeter area may be segregated into 4 discrete segments with four of them being highlighted to represent, approximately, the 78% charge level.

A charge state of one or more batteries may also be indicated using other types of visual indicators. For example, a charge state may be indicated using a non-circular indicator made up of a discrete number of segments where an appropriate number of the segments are illuminated, darkened, or otherwise highlight based on the charge state (e.g., 3 of 5 segments are darkened when the charge state is near 60%). Indicator 1940 may be configured to display in various increments such as 1%, 2%, 5%, 10%, or 25% depending on the resolution of the measurement of the charge state and/or the desired resolution for the display. In one example, the charge state of one or more of the batteries may be measured in 1% or smaller increments, but indicator 1930 and/or indicator 1940 may only display the charge state(s) in multiples of 5%, 10%, 25%, or some other value. A quantitatively indicated charge value, such as "78%," and a graphical representation of that charge state, such as the perimeter of indicator 1940, may be displayed with different resolutions.

Figure 21:
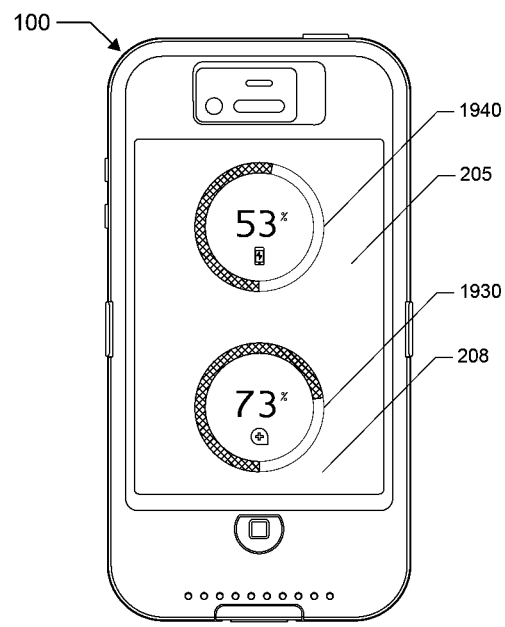
FIG. 21 illustrates an example of displaying battery charge information when two batteries are not fully charged.

FIG. 21 illustrates an example of displaying battery charge information in a situation in which both batteries are partially discharged. Indicator 1940 indicates that the battery associated with indicator 1940 has been discharged to 53% of full capacity. Indicator 1930 indicates that its associated battery has been discharged to 73% of full capacity. As described above, various algorithms and/or profiles may be used to determine which of the batteries electronic device 205 should be drawing current from under various circumstances. The indicators may also include icons or other information that indicates whether the associated battery is being charged. In this example, the battery associated with indicator 1940 is the internal battery of electronic device 205. This internal battery can be charged by the battery of protective enclosure 100 even when neither electronic device 205 nor protective enclosure 100 is connected to an external power source. In other words, the lightning bolt icon within the phone icon indicates that the battery of protective enclosure 100 is currently being charged. When the battery of protective enclosure 100 charges the battery of mobile device 205, the value indicated by indicator 1930 will decrease while the value indicated by indicator 1940 will. The icon indicating that a battery is being charged may appear within the associated indicator, as illustrated in FIG. 21, or may be displayed elsewhere on touch screen 208. The icon may also flash or otherwise vary in a time related manner (e.g., a lightning bolt associated with the icon that flashes on and off) to indicate that the associated battery is being charged.

Figure 22:
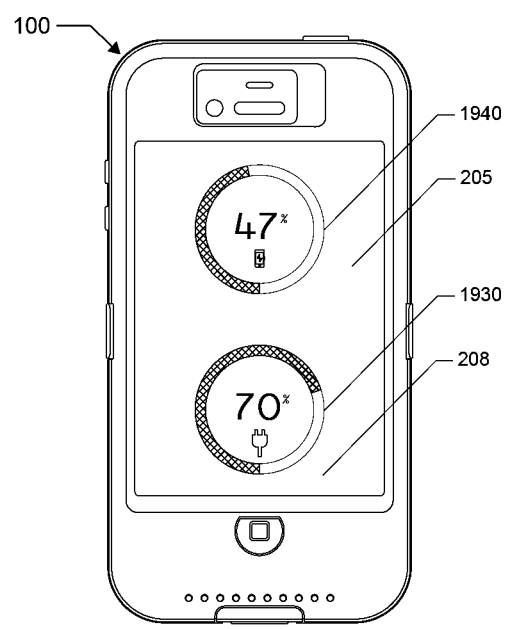
FIG. 22 illustrates an example of displaying battery charge information when power is being received from an external power source.

FIG. 22 illustrates an example of displaying battery charge information when protective enclosure 100 is attached to an external power source. Indicator 1930 indicates that the battery of protective enclosure 100 is currently at 70% charge. An icon or other type of visual indicator may be displayed in or near indicator 1930 to further indicate that protective enclosure 100 is plugged in or otherwise receiving power from an external power source. For example, in FIG. 22 indicator 1930 includes an icon of an electrical plug to indicate that it is receiving power from an external power source. The icon may also flash or otherwise vary in a time related manner to indicate that the battery of protective enclosure 100 is being charged. In some configurations, the icon may flash while one or more of the battery(s) are charging and remain solid when protective enclosure 100 is still attached to the external power source, but charging of the battery(s) is completed.

As described in the examples above, the current from an external power source may be divided among two or more batteries. Various algorithms and/or profiles may be used to determine how the current received from the external power source may be allocated among the two or more batteries.

In addition to conveying charge state information as described above, the software application may also, or alternatively, convey charge state information by changing a color of one or more of indicator 1930 and indicator 1940. For example, one or both indicators may be displayed in one color when the charge is above a threshold and change to a different color, red for example, when the charge level of the associated battery drops to or below that threshold. In other words, in this example, indicator 1940 turns red when the internal battery of electronic device 205 is less than or equal to 20%. The indicator may then return to the original color when the charge level is above that threshold, or above another threshold. Color changes of the indicators, or one or more parts of the indicators, may also be used to indicate when one or more of the batteries are being charged. For example, indicator 1930 may be green when protective enclosure 100 is not connected to an external power source and may turn blue when it is connected to an external power source. A further distinction may be made by varying the color of indicator when charging has completed and protective enclosure 100 is still connected to the external power source.

Figure 23:
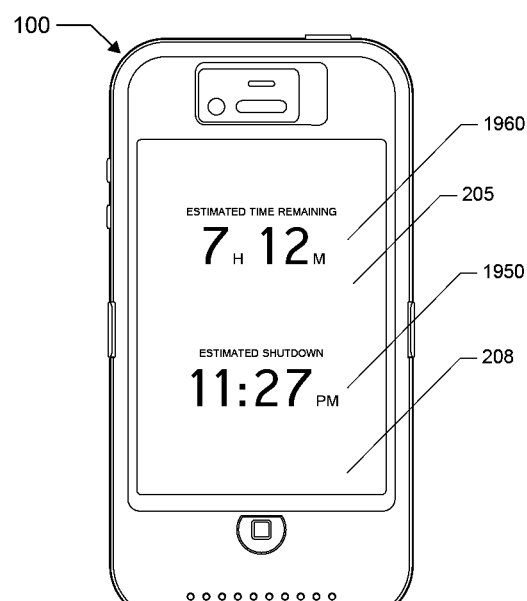
FIG. 23 illustrates an example of displaying time remaining information based on battery charge information.

FIG. 23 illustrates an example of displaying time remaining information based on battery charge information. Indicator 1960 displays an estimated amount of use time remaining for electronic device 205 based on the charge state of one or more batteries. In the example of FIG. 23, the software application running on electronic device 205 has determined that the one or more batteries are expected to provide 7 hours and 12 minutes of additional use time for electronic device 205 before being depleted. Based on the estimated time remaining and a current time, indicator 1950 indicates the approximate time of day at which electronic device 205 will shut down because the batteries are depleted. The algorithm(s) used to determine the values displayed by indicators 1950 and 1960 may take into account one or more of many factors including, but not limited to: battery charge status, battery health, usage profiles, usage patterns, historical behavior patterns, time of day, day of week, location, current computing resource utilization, expected future computing resource utilization, number of software applications or programs running, scheduled events, scheduled meetings, wireless signal strength, or other factors affecting how much power is being used by electronic device 205 and protective enclosure 205 or how much power is expected to be used by electronic device 205 in the future.

In some configurations, a user may manually toggle between the display of FIG. 23 and one of the displays in FIGS. 19-22 or the software application may automatically switch between displays. Any combination of indicator 1930, indicator 1940, indicator 1950, and indicator 1960 may be displayed on touch screen 208. In one configuration, a user can optionally configure which of these indicators will be displayed on a particular screen and/or in what positions they are displayed.

In one example, a case for an electronic device is provided. The case includes a battery and electrical circuitry. The electrical circuitry is configured to receive electrical power from a power source connected to the case, supply the electrical power to the electronic device, and monitor an amount of current of the electrical power used by the electronic device. The electrical circuitry is also configured to charge the battery using a remaining amount of current of the electrical power where the sum of the amount of current used by the electronic device and the remaining amount of current do not exceed a current limit for the power source.

In one variation of the example above, the electrical circuitry provides a charging current from the battery to the electronic device when the power source is not providing the electrical power.

In another variation, the electrical circuitry steps down a voltage of the electrical power received from the power source and steps up a voltage of the electrical power supplied to the electronic device.

In yet another variation, the electrical circuitry detects a characteristic of the power source and determines the current limit for the power source based on the detected characteristic. In the situation where the power source is connected using a USB connector, the electrical circuitry detects the characteristic by detecting a voltage on a data line of the USB connector.

In some variations, the current limit for the power source is less than a maximum specified current for the power source.

In another variation of the examples above, the case includes a hard shell that attaches to the electronic device and a cushion layer over the hard shell.

In another variation the case includes a solar cell and the electrical power is received from the solar cell when the power source is not providing the electrical power.

In another example, a protective enclosure for a mobile computing device includes a hard shell that protects the mobile computing device, an interface to a battery, and a computer processor. The computer processor is configured to execute instructions to determine a current limit for the mobile computing device based on an amount of electrical current consumed by the protective enclosure and supply electrical current to the mobile computing device up to the determined current limit.

In one variation, the protective enclosure includes a connector to receive electrical power from an external power source and electrical current derived from the electrical power received from the external power source is provided to the mobile computing device. Electrical power is supplied to the mobile computing device by the battery when the protective enclosure is not receiving electrical power from the external power source.

In yet another variation, the power source is connected to the case inductively.

In another example, a method of performing power management in a case for an electronic device is provided. The method includes, when the case is receiving power from an external power source, limiting the power received from the external source based on a current limit associated with the external power source, distributing a first portion of the received power to the electronic device, and distributing a second portion of the received power to circuitry for charging a battery of the case. The method also includes, when the case is not receiving power from the external source, distributing supplemental power from the case battery to the electronic device.

In one variation of the example above, the method includes increasing a voltage associated with the power to a value that is within a voltage input range of the electronic device and/or decreasing a voltage associated with the received power.

In some configurations, determining the limit for the power source includes determining the limit based on information received from the external power source.

The components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A case for an electronic device, the case comprising:
a rechargeable battery; and
electrical circuitry configured to:
  determine a characteristic of an external power source removably connected to the case, wherein the characteristic is determined by detecting one or more voltage levels present on a cable that removably attaches the external power source to the case;
  receive electrical power from the external power source through the cable, wherein the electrical circuitry limits a current of the received electrical power to a current limit, the current limit determined based on the determined characteristic of the external power source;
  receive an electronic data communication from an electronic device installed in the case, the electronic data communication including charging information, wherein the charging information includes a charge level and a charge rate of a battery of the electronic device;
  allocate a first portion of the received electrical power to the electronic device and allocate a second portion of the received electrical power to the rechargeable battery of the case, wherein respective magnitudes of the first portion and the second portion are determined based on the charging information received in the electronic data communication from the electronic device; and
  charge the rechargeable battery using the second portion of the electrical power.

2. The case of claim 1 wherein the electrical circuitry is further configured to provide a charging current from the rechargeable battery to the electronic device when the case is not receiving the electrical power from the external power source.

3. The case of claim 1 wherein the electrical circuitry is further configured to:
step down a voltage of the electrical power received from the external power source; and
step up a voltage of the first portion of the electrical power supplied to the electronic device.

4. The case of claim 1 wherein the case receives the electrical power from the external power source through a universal serial bus (USB) connector and the cable comprises a USB cable that electrically interfaces to the USB connector of the case.

5. The case of claim 4 wherein the one or more voltage levels are detected at one or more data lines of the USB connector.

6. The case of claim 1 wherein the current limit for the external power source is less than a maximum specified current for the external power source.

7. The case of claim 1 further comprising:
a hard shell that attaches to the electronic device; and
a cushion layer disposed over the hard shell.

8. The case of claim 1 further comprising a solar cell, wherein the electrical power is received from the solar cell when the external power source is not providing the electrical power.

9. The case of claim 1 wherein the received charging information on which the respective magnitudes of the first portion and the second portion of the electrical power are determined further includes a capacity of the battery of the electronic device.

10. A protective enclosure for a mobile computing device, the protective enclosure comprising:
a shell that protects the mobile computing device when the mobile computing device is installed in the shell;
an interface to a battery; and
a computer processor configured to execute instructions stored on a non-transitory computer storage medium to:
  receive an electronic data communication from the mobile computing device, the electronic data communication including charging information, wherein the charging information includes a charge level and a charge rate of the mobile computing device;
  receive electrical power from an external power source, the received electrical power having a current that is limited to a current limit by the computer processor, the current limit determined based on a detected characteristic of the external power source;

allocate a first portion of the received electrical power to the mobile computing device and allocate a second portion of the received electrical power to the battery, wherein respective magnitudes of the first portion and the second portion are determined based on the charging information received in the electronic data communication; and transmit the second portion of the electrical power to the interface for charging the battery.

11. The protective enclosure of claim 10 wherein the computer processor further executes the instructions to control charging of the battery using the second portion of the electrical power.

12. The protective enclosure of claim 10 further comprising a connector to receive the electrical power from the external power source.

13. The protective enclosure of claim 12 wherein the connector includes a USB connector.

14. The protective enclosure of claim 10 wherein the battery provides electrical power to the mobile computing device when the protective enclosure is not receiving the electrical power from the external power source.

15. The protective enclosure of claim 10 wherein the computer processor further executes the instructions to determine the current limit further based on an amount of electrical current consumed by the protective enclosure.

16. The protective enclosure of claim 10 wherein the detected characteristic of the external power source comprises a voltage level detected on a cable attaching the external power source to the protective enclosure and detected at the protective enclosure.

17. The protective enclosure of claim 10 wherein the external power source is connected to the case inductively.

18. A method of performing power management in a case for an electronic device, the method comprising:

when the case is receiving power from an external power source:

receiving an electronic data communication from the electronic device that includes information regarding charging characteristics of the electronic device;

limiting the power received from the external power source based on a current limit associated with the external power source;

allocating a first portion of the received power to the electronic device and allocating a second portion of the received power to a rechargeable battery of the case, wherein respective magnitudes of the first portion and the second portion are determined based on the information in the electronic data communication;

distributing the first portion of the received power to the electronic device; and distributing the second portion of the received power to circuitry for charging the rechargeable battery of the case; and when the case is not receiving power from the external power source:

distributing supplemental power from the rechargeable battery to the electronic device.

19. The method of claim 18 wherein distributing power to the electronic device includes increasing a voltage associated with the power to a value that is within a voltage input range of the electronic device.

20. The method of claim 18 wherein receiving power from the external power source includes decreasing a voltage associated with the received power.

21. The method of claim 18 wherein limiting the power received from the external power source based on the current limit includes determining the current limit associated with the external power source based on information received from the external power source.

22. The method of claim 18 wherein the magnitude of the second portion is determined further based on the magnitude of the first portion and the current limit.

* * * * *